United States Patent
Ma et al.

(10) Patent No.: US 12,040,609 B2
(45) Date of Patent: Jul. 16, 2024

(54) METHOD AND SYSTEM FOR AC LINE DISTANCE PROTECTION IN AC/DC HYBRID POWER GRID, AND STORAGE MEDIUM

(71) Applicant: NORTH CHINA ELECTRIC POWER UNIVERSITY, Beijing (CN)

(72) Inventors: Jing Ma, Beijing (CN); Yuchong Wu, Beijing (CN); Jingya Kang, Beijing (CN); Chen Liu, Beijing (CN)

( * ) Notice: Subject to any disclaimer, the term of this patent is extended or adjusted under 35 U.S.C. 154(b) by 580 days.

(21) Appl. No.: 17/372,409

(22) Filed: Jul. 9, 2021

(65) Prior Publication Data

US 2022/0021207 A1    Jan. 20, 2022

(30) Foreign Application Priority Data

Jul. 15, 2020   (CN) .......................... 202010681298.2

(51) Int. Cl.
*H02J 3/00* (2006.01)
*H02J 3/36* (2006.01)
*H02M 1/32* (2007.01)

(52) U.S. Cl.
CPC .............. *H02J 3/0012* (2020.01); *H02J 3/36* (2013.01); *H02M 1/325* (2021.05)

(58) Field of Classification Search
CPC .............. H02J 3/12; H02J 3/36; H02M 1/325
See application file for complete search history.

(56) References Cited

U.S. PATENT DOCUMENTS 8,928,449 B2 *   1/2015   Silva .................. H01F 3/14
                                                  336/84 R

OTHER PUBLICATIONS

Mirsaeidi et al. 'An Integrated Control and Protection Scheme to Inhibit Blackouts Caused by Cascading Fault in Large-Scale Hybrid AC/DC Power Grids', Aug. 2019, IEEE Publication, vol. 34, No. 8, pp. 7278-7291 (Year: 2019).*
Chinese Office Action dated Mar. 29, 2021 for CN Application No. 202010681298.2, 23 pages.
Performance of Distance Protection for Transmission Lines in an HVDC/AC Interconnected Power System, ZHANG Pu, Automation of Electric Power Systems, vol. 36 No.6, Mar. 25, 2012, 7 Pages.

(Continued)

*Primary Examiner* — Elias Desta
(74) *Attorney, Agent, or Firm* — Analects Legal LLC

(57) ABSTRACT

The disclosure relates to a method and system for AC line distance protection in AC/DC hybrid power grid, and storage medium. The method comprises: collecting the operation parameters of inverter-side converter, AC parameters, converter bus voltage, current at distance protection installation and operation parameters of the smoothing reactor of inverter station; determining the conduction state of the inverter-side converter according to the operation parameters of the inverter-side converter; determining the current fed into the AC system from the DC system corresponding to the conduction state according to the operation parameters of the inverter-side converter, the operation parameters of the smoothing reactor of the inverter station and the converter bus voltage; determining the virtual fault location and virtual transition resistance according to fault types and AC parameters; controlling the corresponding protection device to perform the protection action according to the virtual fault location and virtual transition resistance.

19 Claims, 14 Drawing Sheets

(56) References Cited

OTHER PUBLICATIONS

Analysis of Grounding Fault at HVDC Converter Transformer Valve Side, LI Xiaohua, Transactions of China Electrotechnical Society, vol. 27 No.6, Jun. 30, 2012, 8 Pages.
Abdulrahman, A., et al., 'HVDC Transmission: Technology Review, Market Trends and Future Outlook', Renewable and Sustainable Energy Reviews, 2019, 112, pp. 530-554.
Long, W., et al., 'HVDC transmission: Yesterday and today', IEEE Power and Energy Magazine, 2007, 8, (2), pp. 22-31.
Javad, K., et al., 'Review of HVDC control in weak AC grids', Electric Power Systems Research, 2018, 162, pp. 194-206.
Yang, H. H., et al., 'A novel assessment index of LCC-HVDC system impact on short-term voltage stability of the receiving-end AC system', IEEE Transactions on Power Delivery, 2017, 142, pp. 125-133.
Son, H. I., et al., 'An Algorithm for Effective Mitigation of Commutation Failure in High-Voltage Direct-Current Systems', IEEE Transactions on Power Delivery, 2016, 31, (4), pp. 1437-1446.
Luo, S. B., et al., 'Non-unit transient based boundary protection for UHV transmission lines', International Journal of Electrical Power & Energy Systems, 2018, 102, pp. 349-363.
Zheng, J. C., et al., 'A novel differential protection scheme for HVDC transmission lines', International Journal of Electrical Power & Energy Systems, 2018, 94, pp. 171-178.
Vazquez, E., et al., 'A New Approach Traveling-Wave Distance Protection—Part I: Algorithm', IEEE Transactions on Power Delivery, 2007, 22, (2), pp. 795-800.
Shehab-Eldin, et al., 'Travelling wave distance protection-problem areas and solutions', IEEE Transactions on Power Delivery, 1988, 3, (3), pp. 894-902.
Vitins, M., 'A correlation method for transmission line protection', IEEE Transactions on Power Apparatus and Systems, 1978, PAS-97, (5), pp. 1607-1617.
Ma, J., et al.:'An adaptive distance protection scheme based on the voltage drop equation', IEEE Transactions on Power Delivery, 2015, 30, (4), pp. 1931-1940.
Ma, J., et al., 'A novel adaptive distance protection scheme for DFIG wind farm collector lines', International Journal of Electrical Power & Energy Systems, 2018, 94, pp. 234-244.
Rahimi, E., et al., 'Commutation Failure Analysis in Multi-Infeed HVDC Systems', IEEE Transactions on Power Delivery, 2011, 26, (1), pp. 378-384.
Kristmundsson, et al., The effect of AC system frequency spectrum on commutation failure in HVDC inverters, IEEE Transactions on Power Delivery, 1990, 5, (2), pp. 1121-1128.
Thio, C. V., et al., 'Commutation failures in HVDC transmission systems', IEEE Transactions on Power Delivery, 1996, 11, (2), pp. 946-957.
Huang, S. F., et al., 'Effect of commutation failure on the distance protection and the countermeasures', IET Generation, Transmission & Distribution, 2015, 9, (9), pp. 838-844.
Wang, D., et al., 'Novel pilot protection for AC transmission line connected to LCC-HVDC inverter station', International Journal of Electrical Power & Energy Systems, 2019, 108, pp. 347-358.
Zhu, Y. N., et al., 'Prevention and mitigation of high-voltage direct current commutation failures: a review and future directions', IET Generation, Transmission & Distribution, 2019, 13, (24), pp. 5449-5456.
Segui, T., et al., 'Fundamental basis for distance relaying with parametrical estimation', IEEE Transactions on Power Delivery, 2000, 15, (2), pp. 659-664.

\* cited by examiner

METHOD AND SYSTEM FOR AC LINE DISTANCE PROTECTION IN AC/DC HYBRID POWER GRID, AND STORAGE MEDIUM

CROSS-REFERENCE TO RELATED APPLICATIONS

This disclosure claims priority to Chinese Patent Disclosure No. 202010681298.2, filed on Jul. 15, 2020, which is hereby incorporated by reference in their entirety.

TECHNICAL FIELD

The invention relates to the technical field of HVDC transmission, and particularly relates to a method and system for AC line distance protection in AC/DC hybrid power grid, and storage medium.

BACKGROUND

In recent years, with HVDC transmission technology being widely applied in the field of long-distance large-capacity power transmission, refused operation and mal-operation of AC-side distance protection caused by commutation failure in DC system occurs ever more frequently, greatly endangering the safety and stability of power grid. Therefore, fast and accurate isolation of AC-side fault is very important to guarantee the safe operation of AC/DC hybrid system.

Scholars have performed related research about the AC line distance protection. Currently, the method is mainly divided into the following three types: distance protection based on traveling-wave distance measurement, distance protection based on power-frequency variables and time-domain distance protection.

However, the above distance protection methods are only applicable to AC system. With large-scale DC system connected to AC power grid, commutation failure of DC system caused by AC side fault will lead to nonlinear and time-varying fault characteristics of converter station, which may cause misoperation or refused operation of traditional distance protection.

SUMMARY

In view of the above analysis, the invention aims to propose a method and system for AC line distance protection in AC/DC hybrid power grid, and storage medium. When large-scale DC system is connected to AC power grid, the fault location can be predicted according to the nonlinear and time-varying fault characteristics of converter station, so as to reduce the probability of refused operation or misoperation of the protection device when the converter station is nonlinear.

The purpose of the invention is mainly achieved by the following technical solutions.

For the first aspect, embodiment of present invention proposes a method for AC line distance protection in AC/DC hybrid power grid, comprising:

collecting operation parameters of inverter-side converter, AC parameters, converter bus voltage, current of distance protection installation and operation parameters of the smoothing reactor of inverter station;

determining conduction state of the inverter-side converter according to the operation parameters of the inverter-side converter;

determining current fed into the AC system from the DC system corresponding to the conduction state, according to the operation parameters of the inverter-side converter, the operation parameters of the smoothing reactor of the inverter station and the converter bus voltage;

determining a virtual fault location and a virtual transition resistance, according to a fault type, the current fed into the AC system from the DC system and the AC parameters;

controlling a corresponding protection device to perform protection action, according to the current at distance protection installation, the virtual fault location and the virtual transition resistance.

Furthermore, the inverter-side converter is a 12-pulse converter, and the operation parameters of the inverter-side converter include: the conduction state of each valve arm in the 12-pulse converter;

determining that the inverter-side converter is in the conduction states of four valve arms, five valve arms, six valve arms, seven valve arms or eight valve arms according to the conduction state parameters of each valve arm in the 12-pulse converter.

furthermore, equation 1 is used to determine the current fed into the AC system by the DC system corresponding to the conduction states of the four valve arms:

$$I = \int [(K_d A_{d4} + K_y A_{y4})U - K_d D_{d4} - K_y D_{y4}]dt + f_{icom}(U) \quad 1$$

equation 2 is used to determine the current fed into the AC system by the DC system corresponding to the conduction states of the five valve arms.

$$I = \int [(K_y A_{i5}^{-1}(A_{g5} + A_{d5}) + K_d A_{d5}]Udt - \int (K_y A_{i5}^{-1} + K_d) D_{d5}dt + f_{icom}(U) \quad 2$$

equation 3 is used to determine the current fed into the AC system by the DC system corresponding to the conduction states of the six valve arms.

$$I = \int [-(K_d A_{d6} + K_y A_{y6})U]dt + f_{icom}(U) \quad 3$$

equation 4 is used to determine the current fed into the AC system by the DC system corresponding to the conduction states of the seven valve arms.

$$I = \int [-(K_d A_{d7} + K_y A_{y7})U]dt + f_{icom}(U) \quad 4$$

equation 5 is used to determine the current fed into the AC system by the DC system corresponding to the conduction states of the eight valve arms.

$$I = \int [-(K_d A_{d8} + K_y A_{y8})U]dt + f_{icom}(U) \quad 5$$

where $D_{d4}$, $D_{y4}$, $A_{d4}$, $A_{y4}$ are respectively the parameter matrixes under the conduction states of the four valve arms; $D_{d5}$, $A_{d5}$, $A_{g5}$, $A_{i5}$ are respectively the parameter matrixes under the conduction states of the five valve arms; $A_{d6}$, $A_{y6}$ are respectively the parameter matrixes under the conduction states of the six valve arms; $A_{d7}$, $A_{y7}$ are respectively the parameter matrixes under the conduction states of the seven valve arms; $A_{d8}$, $A_{y8}$ are respectively the parameter matrixes under the conduction states of the eight valve arms; $f_{icom}(U)$, which is the current that flows through AC filter and reactive power compensation device, is the function of converter bus voltage, when the parameters of AC filter and reactive power compensation device are fixed; U is the voltage matrix of the converter bus; I is the current matrix fed into the AC system from the DC system; $K_y$ is the transformation matrix of the Y-bridge converter and $K_d$ is the transformation matrix of the D-bridge converter; wherein, the 12-pulse converter comprises: Y-bridge converter and D-bridge converter.

Further, determining the virtual fault position and the virtual transition resistance according to the fault type, the current fed into the AC system by the DC system and the AC parameters;

according to the virtual fault position equation, the virtual fault position and the virtual transition resistance are determined.

Furthermore, when the fault type is single-phase to ground fault, the virtual fault location equation is determined by equation 6:

$$p_1+p_2R_g+p_3x+p_4x^2=0 \qquad 6$$

where $R_g$ is the virtual transition resistance, x is the virtual fault location, $p_1$, $p_2$, $p_3$, $p_4$ are respectively:

$$\begin{cases} p_1 = dL_0\frac{du_{ma}}{dt} + L_{W0}\frac{du_{ma}}{dt} + dR_0u_{ma} + R_{W0}u_{ma} \\ p_2 = 3\left(-dL_0\frac{di_{m0}}{dt} - L_{W0}\frac{di_{m0}}{dt} - dR_0i_{m0} - R_{W0}i_{m0} + u_{m0}\right) \\ p_3 = -L_0\frac{du_{ma}}{dt} - dL_0L_l\frac{d^2i_{ma}}{dt^2} = 3dk_LL_0L_l\frac{d^2i_{m0}}{dt^2} - \\ \qquad L_{W0}L_l\frac{d^2i_{ma}}{dt^2} - 3k_LL_{W0}L_l\frac{d^2i_{m0}}{dt^2} - dL_lR_0\frac{di_{ma}}{dt} - \\ \qquad 3dk_LL_lR_0\frac{di_{m0}}{dt} - dL_0R_l\frac{di_{ma}}{dt} - 3dk_RL_0R_l\frac{di_{m0}}{dt} - \\ \qquad L_{W0}R_l\frac{di_{ma}}{dt} - 3k_RL_{W0}R_l\frac{di_{m0}}{dt} - dR_0R_li_{ma} - \\ \qquad 3k_RdR_0R_li_{m0} - L_lR_{W0}\frac{di_{ma}}{dt} - 3k_LL_lR_{W0}\frac{di_{m0}}{dt} - \\ \qquad R_lR_{W0}i_{ma} - 3k_RR_lR_{W0}i_{m0} - R_0u_{ma} \\ p_4 = L_0L_l\frac{d^2i_{ma}}{dt^2} + 3k_LL_0L_l\frac{d^2i_{m0}}{dt^2} + L_lR_0\frac{di_{ma}}{dt} + \\ \qquad 3k_LL_lR_0\frac{di_{m0}}{dt} + L_0L_l\frac{di_{ma}}{dt} + 3k_RL_0R_l\frac{di_{m0}}{dt} + \\ \qquad R_0R_li_{ma} + 3k_RR_0R_li_{m0} \end{cases}$$

where, d=1; $R_0$ and $L_0$ are respectively zero-sequence resistance and zero-sequence inductance of AC line; $R_{W0}$, $L_{W0}$ are respectively zero-sequence resistance and zero-sequence inductance of AC system at receiving end; $u_{m0}$ is zero-sequence voltage of AC line close to the DC system side; $i_{m0}$ is zero-sequence current of AC line close to the DC system side; $R_l$, $L_l$ are positive-sequence resistance and positive-sequence inductance of AC line respectively, $k_R = (R_0-R_l)/(3R_l)$, $k_L=(L_0-L_l)/(3L_l)$, the AC parameters include: $R_0$, $L_0$, $R_{W0}$, $L_{W0}$, $u_{m0}$, $i_{m0}$, $R_l$ and $L_l$; $u_{ma}$ is the voltage component of the corresponding converter bus in the case of the fault; $i_{ma}$ is the current component fed into the AC system by the corresponding DC system in the case of the fault.

Furthermore, when the fault type is phase-to-phase fault, the virtual fault location equation is expressed by equation 7:

$$p_5+p_6R_g+p_7x+p_8x^2=0 \qquad 7$$

where $R_g$ is the virtual transition resistance, x is the virtual fault location, $p_5$, $p_6$, $p_7$, $p_8$ are respectively:

$$\begin{cases} p_5 = 2dL_l\frac{du_{mab}}{dt} + 2L_W\frac{du_{mab}}{dt} + 2dR_lu_{mab} + 2R_Wu_{mab} \\ p_6 = \Delta u_{mab} - dL_l\Delta\frac{di_{mab}}{dt} - L_W\Delta\frac{di_{mab}}{dt} - \\ \qquad d\Delta i_{mab}R_l - \Delta i_{mab}R_W \\ p_7 = -2L_l\frac{du_{mab}}{dt} - 2dL_l^2\frac{d^2i_{mab}}{dt^2} - 2L_WL_l\frac{d^2i_{mab}}{dt^2} - \\ \qquad 4dL_lR_l\frac{di_{mab}}{dt} - 2L_WR_l\frac{di_{mab}}{dt} - \\ \qquad 2dR_l^2i_{mab} - 2L_lR_W\frac{di_{mab}}{dt} - 2R_lR_Wi_{mab} - 2R_lu_{mab} \\ p_8 = 2L_l^2\frac{d^2i_{mab}}{dt^2} + 4L_lR_l\frac{di_{mab}}{dt} + 2R_l^2i_{mab} \end{cases}$$

where $u_{mab}$, $i_{mab}$ are the two-phase voltage difference value and current difference value of the AC line close to the DC system side respectively; $\Delta u_{mab}$, $\Delta i_{mab}$ are respectively the fault component of the two-phase voltage difference value and the fault component of the current difference value of the AC line near to the DC system side; $R_w$, $L_w$ are respectively the equivalent resistance and the equivalent inductance of the AC system at the receiving end, and the AC parameters include: $u_{mab}$, $\Delta u_{mab}$, $R_w$, $L_w$ and $\Delta i_{mab}$; the $i_{mab}$ is calculated with the component of the current fed into the AC system from the DC system.

Furthermore, when the fault types are two-phase grounding fault and three-phase short circuit fault, the virtual fault location equation is expressed by equation 8:

$$p_5+2p_6R_g+p_7x+p_8x^2=0 \qquad 8$$

Furthermore, determining the fault likeness factor according to the virtual fault location, the virtual transition resistance, the fault location equation and the current at the distance protection installation position;

when the fault likeness factor is not less than the preset threshold value of action, determining the fault in the AC line zone and controlling the corresponding protection device to perform the corresponding protection action in the AC line zone when the fault likeness factor is less than the threshold value of action, determining the fault outside the AC line zone and controlling the corresponding protection device to perform the corresponding protection action outside the AC line zone.

Furthermore, wherein determining the fault likeness factor according to the fault location equation and the current of each sampling point comprises specifically as follows:

The fault likeness factor is expressed by equation 9:

$$S_{hvdc} = \sum_{i=1}^{n} \frac{1}{|p_c(i) + p_{rg}(i)R_g + p_x(i)x + p_{x2}(i)x^2|} \qquad 9$$

where, $S_{hvdc}$ is the fault likeness factor; n is the number of sampling points in 10 ms; $p_c(i)$, $p_{rg}(i)$, $p_x(i)$ and $p_{x2}(i)$ are respectively the constant term, the coefficient before transition resistance term, the coefficient before the virtual fault location term and the coefficient before the square term of the virtual fault location in the virtual fault location equation calculated by using the actual fault data of the ith sampling point.

For the second aspect, the embodiment of the disclosure provides a system for AC line distance protection in AC/DC hybrid power grid comprising:

a data collection device configured to collect operation parameters of inverter-side converter, AC parameters, converter bus voltage, current at distance protection installation and operation parameters of the smoothing reactor of inverter station;

a first processor for current calculation configured to determine a conduction state of the inverter-side converter according to the operation parameters of the inverter-side converter; and configured to determine current fed into the AC system from the DC system corresponding to the conduction state, according to the operation parameters of the inverter-side converter, the operation parameters of the smoothing reactor of the inverter station and the converter bus voltage;

a second processor for virtual fault location calculation configured to determine a virtual fault location and a virtual transition resistance according to a fault type, the current fed into the AC system from the DC system and the AC parameters;

a third processor for protection control configured to control a corresponding protection device to perform protection action, according to the current at distance protection installation, the virtual fault location and the virtual transition resistance.

The beneficial effect of the technical solution of the invention is following: the invention discloses a method and system of AC line distance protection in AC/DC hybrid power grid comprising: calculating the current fed into the AC system by the DC system, determining the fault position by using the current, and the fault location obtained by using the threshold value of action and by the fault likeness factor check, so as to reduce the probability of refused operation or misoperation of the protection device when the converter station presents nonlinear characteristics. In addition, the conduction state of each valve arm of the converter is taken into account when calculating the fault location, which further improves the accuracy of the fault location.

Other features and advantages of the invention will be set forth in subsequent specifications and, in part, will become apparent from the description or understood by implementing the invention. The object and other advantages of the present invention can be realized and obtained by the structure specially pointed out in the description and the drawings.

BRIEF DESCRIPTION OF DRAWINGS

The attached figures are only for the purpose of illustrating specific embodiments, and are not considered to limit the present disclosure. In the whole figures, the same reference symbols indicate the same components.

FIG. 4b is a schematic diagram of the change of the fault likeness factor during the Phase A-to-ground fault corresponding to FIG. 4a;

FIG. 5b is a schematic diagram of the change of the fault likeness factor during the Phase A-to-ground fault corresponding to FIG. 5a;

FIG. 6b is a schematic diagram of the change of the fault likeness factor during the Phase A-to-ground fault corresponding to FIG. 6a;

REFERENCE MARK

1—AC system S2, 2—AC filter at rectifier-side, 3—converter at rectifier-side, 4—converter at rectifier-side, 5—DC filter, 6—DC line, 7—smoothing reactor, 8—converter at inverter-side, 9—converter at inverter-side, 10—AC filter at inverter-side, 11—AC system S1.

DESCRIPTION OF EMBODIMENTS

The preferred embodiments of the disclosure will be described below in combination with the attached figures in detail, where the attached figures form part of the disclosure and, together with the embodiments of the disclosure, are used to explain the principles of the disclosure, not to define the scope of the disclosure.

Figure 1:
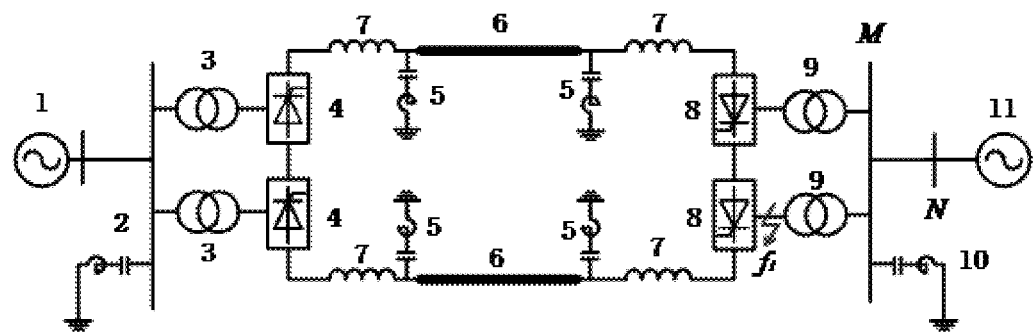
FIG. 1 is a structure diagram of AC/DC hybrid power grid provided by present disclosure.

The method provided by the embodiment of the disclosure is applicable to the AC/DC hybrid power grid. The structure of the AC/DC hybrid power grid is shown in FIG. 1. The AC/DC hybrid power grid includes two branches, and components contained in the two branches are the same. The connection order of the components from left to right is converter on rectifier-side 3—converter at rectifier-side 4—smoothing reactor 7—DC filter 5—DC line 6—smoothing reactor 7—inverter-side converter 8—converter 9. In addition, both S1 side and S2 side of AC system are equipped with AC filter 2 on rectifier-side and AC filter 10 on inverter-side, and reactive power compensation device.

Figure 2:
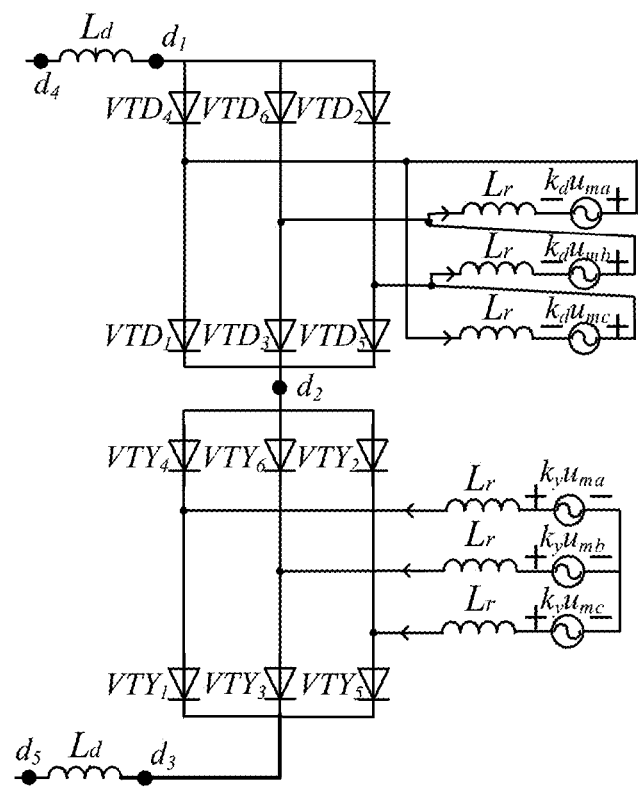
FIG. 2 is a schematic diagram of circuit structure of 12-pulse converter provided by embodiment of present disclosure.

The inverter-side converter of the AC/DC hybrid power grid is a 12-pulse converter, and its circuit structure is shown in FIG. 2, which is composed of D-bridge converter and Y-bridge converter. The main parameters are as follows: the rated frequency is 50 Hz, the capacity of inverter-side converter is 598 MVA, the transformation ratio of inverter-side converter is 331.2 kV/200.6 kV, the impedance percentage of inverter-side converter is 16%, the inductance of smoothing reactor is 290 mH, the length of AC line M-N is 80 km, the positive-sequence resistance of AC line M-N is 0.0216 Ω/km, the positive-sequence reactance of AC line M-N is 0.2750 Ω/km. The zero-sequence resistance of AC line M-N is 0.1672 Ω/km, the zero-sequence reactance of AC line M-N is 0.6255 Ω/km.

Figure 3:
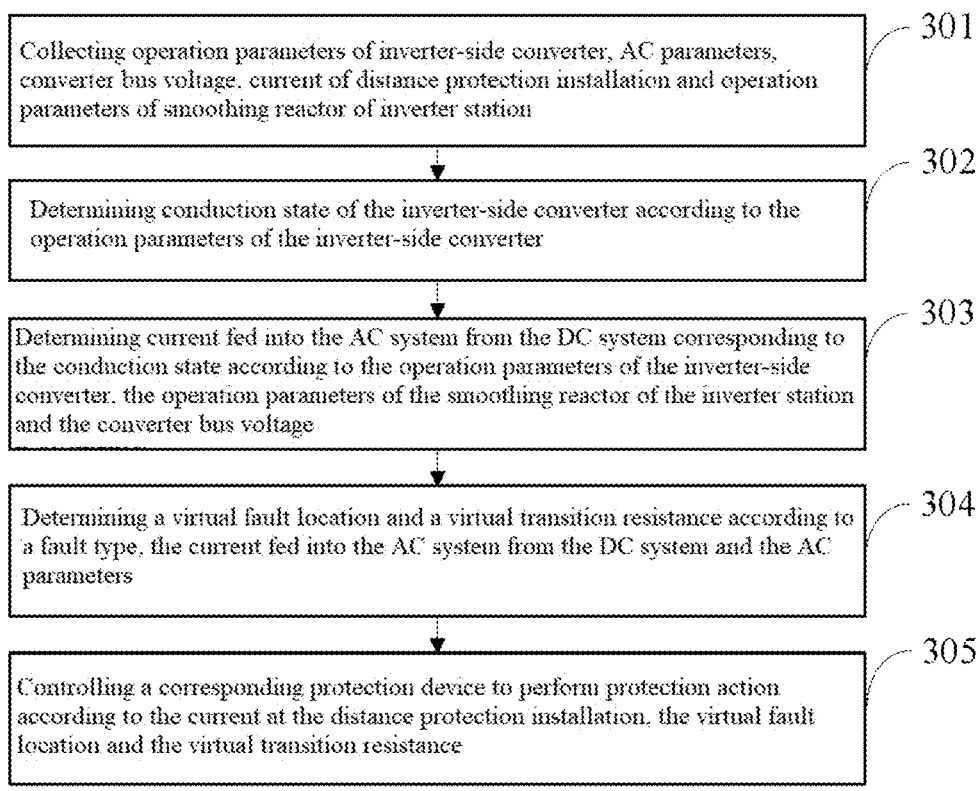
FIG. 3 is a flow chart of method for AC line distance protection in AC/DC hybrid power grid provided by embodiment of present disclosure.

Based on this, the embodiment of the disclosure provides a method for AC line distance protection in AC/DC hybrid power grid, as shown in FIG. 3, comprising the following steps:

Step 301, the operation parameters of inverter-side converter, AC parameters, the converter bus voltage, current at distance protection installation and operation parameters of smoothing reactor of inverter station are collected.

In the embodiment of the disclosure, the inverter-side converter of the AC/DC hybrid power grid is a 12-pulse converter. Collecting the operation parameters of the inverter-side converter includes: the transformation ratio of the D-bridge converter, the transformation ratio of the Y-bridge converter and the valve arm conduction state parameters in each converter. AC parameters include: zero-sequence resistance and zero-sequence inductance of AC system at receiving end, zero-sequence voltage of AC line near to DC system side, zero-sequence current of AC line near to DC system side, positive-sequence resistance and positive-sequence inductance of AC line, two-phase voltage difference and current difference of AC line near to DC system side, fault component of two-phase voltage difference value and fault component of two-phase current difference value of AC line near to DC system side, equivalent resistance and inductance of AC system at receiving end, zero-sequence resistance and zero-sequence inductance of AC line. The operation parameters of smoothing reactor in inverter station include: voltage at DC line side of smoothing reactor in inverter station. Fault type of the circuit is divided into: single-phase grounding fault, two-phase grounding fault, phase-to-phase fault and three-phase short-circuit fault.

Step 302, according to the operation parameters of the inverter-side converter, the conduction state of the inverter-side converter is determined.

As shown in FIG. 2, when $VTD_1$ and $VTD_2$ in the D-bridge converter is conducted, and $VTY_1$ and $VTY_2$ in the Y-bridge converter is conducted, there are four valve arms conducted in total. At this time, the conduction state of the inverter-side converter is conducted four valve arms. By analogy, the conduction state of the inverter-side converter also includes: conduction states of five valve arms, conduction states of six valve arms, conduction states of seven valve arms and conduction states of eight valve arms. It should be noted that the conduction state parameters of valve arms in each converter can be obtained by differential current transformer, and then the conduction state of current inverter-side converter can be determined according to the conduction state parameters of valve arms in each converter.

Step 303, according to the operation parameters of the inverter-side converter, the operation parameters of the smoothing reactor of the inverter station and the converter bus voltage, the current fed into the AC system from the DC system corresponding to the conduction state is determined.

In the embodiment of the disclosure, equation 1 is used to determine the current fed into the AC system by the DC system corresponding to the conduction states of the four valve arms:

$$I=\int[(K_dA_{d4}+K_yA_{y4})U-K_dD_{d4}-K_yD_{y4}]dt+f_{icom}(U) \qquad 1$$

Equation 2 is used to determine the current fed into the AC system by the DC system corresponding to the conduction states of the five valve arms.

$$I=\int[(K_yA_{i5}^{-1}(A_{g5}+A_{d5})+K_dA_{d5}]Udt-\int(K_yA_{i5}^{-1}+K_d)D_{d5}dt+f_{icom}(U) \qquad 2$$

Equation 3 is used to determine the current fed into the AC system by the DC system corresponding to the conduction states of the six valve arms.

$$I=\int[-(K_dA_{d6}+K_yA_{y6})U]dt+f_{icom}(U) \qquad 3$$

Equation 4 is used to determine the current fed into the AC system by the DC system corresponding to the conduction states of the seven valve arms.

$$I=\int[-(K_dA_{d7}+K_yA_{y7})U]dt+f_{icom}(U) \qquad 4$$

Equation 5 is used to determine the current fed into the AC system by the DC system corresponding to the conduction states of the eight valve arms.

$$I=\int[-(K_dA_{d8}+K_yA_{y8})U]dt+f_{icom}(U) \qquad 5$$

where $D_{d4}$, $D_{y4}$, $A_{d4}$, $A_{y4}$ are respectively parameter matrixes under the conduction states of the four valve arms; $D_{d5}$, $A_{d5}$, $A_{g5}$, $A_{i5}$ are respectively parameter matrixes under the conduction states of the five valve arms; $A_{d6}$, $A_{y6}$ are respectively parameter matrixes under the conduction states of the six valve arms; $A_{d7}$, $A_{y7}$ are respectively parameter matrixes under the conduction states of the seven valve arms; $A_{d8}$, $A_{y8}$ are respectively parameter matrixes under the conduction states of the eight valve arms; $f_{icom}(U)$, which is the current that flows through AC filter and reactive power compensation device, is the function of converter bus voltage when the parameters of AC filter and reactive power compensation device are fixed; U is the matrix of the converter bus voltage; I is a matrix of the current fed into the AC system from the DC system; $K_y$ is transformation matrix of the Y-bridge converter and $K_d$ is transformation matrix of the D-bridge converter.

Taking conduction states of the four valve arms as an example, at this time, $VTD_1$ and $VTD_2$ in the D-bridge converter are conducted, and $VTY_1$ and $VTY_2$ in the Y-bridge converter are conducted. Under these conduction states, the $D_{d4}$, $D_{y4}$, $A_{d4}$, $A_{y4}$ are respectively as follow:

$$A_{d4} = \begin{bmatrix} \frac{-3k_dL_r - k_yL_r - 2L_dk_d}{8L_r^2} & \frac{-3k_dL_r - 2L_dk_d}{8L_r^2} & \frac{k_yL_r - 2k_dL_r - 2L_dk_d}{8L_r^2} \\ \frac{-3k_dL_r - k_yL_r - 2L_dk_d}{8L_r^2} & \frac{-3k_dL_r - 2L_dk_d}{8L_r^2} & \frac{k_yL_r - 2k_dL_r - 2L_dk_d}{8L_r^2} \\ \frac{L_dk_d + k_dL_r - k_yL_r}{-4L_r^2} & \frac{k_dL_r + L_dk_d}{-4L_r^2} & \frac{L_dk_d + 2k_dL_r + k_yL_r}{-4L_r^2} \end{bmatrix}$$

$$A_{y4} = \begin{bmatrix} \frac{-k_d - 3k_y}{8L_r + 6L_d} & \frac{-k_d}{8L_r + 6L_d} & \frac{3k_y + 2k_d}{8L_r + 6L_d} \\ 0 & 0 & 0 \\ \frac{k_d + 3k_y}{8L_r + 6L_d} & \frac{k_d}{8L_r + 6L_d} & \frac{-3k_y - 2k_d}{8L_r + 6L_d} \end{bmatrix}$$

$$D_{d4} = \begin{bmatrix} \frac{u_{drec} - u_{drec2}}{8L_r + 6L_d} \\ \frac{u_{drec} - u_{drec2}}{8L_r + 6L_d} \\ \frac{u_{drec2} - u_{drec}}{4L_r + 3L_d} \end{bmatrix}, D_{y4} = \begin{bmatrix} \frac{3u_{drec} - 3u_{drec2}}{8L_r + 2L_d} \\ 0 \\ \frac{3u_{drec2} - 3u_{drec}}{8L_r + 2L_d} \end{bmatrix}$$

When converter is in the conduction states of five valve arms, at this time, $VTD_1$ and $VTD_2$ in the D-bridge converter are conducted, and $VTY_1$, $VTY_2$ and $VTY_3$ in the Y-bridge converter are conducted. Under these conduction states, the $D_{d5}$, $A_{d5}$, $A_{g5}$ and $A_{i5}$ are respectively as follow:

$$D_{d5} = \begin{bmatrix} \dfrac{2u_{drec} - 2u_{drec2}}{13L_r + 12L_d} \\ \dfrac{2u_{drec} - 2u_{drec2}}{13L_r + 12L_d} \\ -\dfrac{4u_{drec} - 4u_{drec2}}{13L_r + 12L_d} \end{bmatrix}$$

$$A_{d5} = \begin{bmatrix} \dfrac{-5k_dL_r - k_yL_r - 4L_dk_d}{13L_r^2 + 12L_dL_r} & \dfrac{-5k_dL_r - k_yL_r - 4L_dk_d}{13L_r^2 + 12L_dL_r} & \dfrac{2k_yL_r - 3k_dL_r - 4L_dk_d}{13L_r^2 + 12L_dL_r} \\ \dfrac{-5k_dL_r - k_yL_r - 4L_dk_d}{13L_r^2 + 12L_dL_r} & \dfrac{-5k_dL_r - k_yL_r - 4L_dk_d}{13L_r^2 + 12L_dL_r} & \dfrac{2k_yL_r - 3k_dL_r - 4L_dk_d}{13L_r^2 + 12L_dL_r} \\ \dfrac{3k_dL_r + 4L_dk_d - 2k_yL_r}{-13L_r^2 - 12L_dL_r} & \dfrac{3k_dL_r + 4L_dk_d - 2k_yL_r}{-13L_r^2 - 12L_dL_r} & \dfrac{7k_dL_r + 4k_yL_r + 4L_dk_d}{-13L_r^2 - 12L_dL_r} \end{bmatrix}$$

$$A_{g5} = \begin{bmatrix} \dfrac{-k_y + k_d}{3L_r} & \dfrac{k_y + k_d}{3L_r} & \dfrac{k_d}{3L_r} \\ \dfrac{k_y + k_d}{3L_r} & \dfrac{-k_y + k_d}{3L_r} & \dfrac{k_d}{3L_r} \\ \dfrac{k_d}{3L_r} & \dfrac{k_d}{3L_r} & \dfrac{k_d}{3L_r} \end{bmatrix}, \quad A_{i5} = \begin{bmatrix} \dfrac{2}{3} & 0 & 0 \\ 0 & \dfrac{2}{3} & 0 \\ 0 & 0 & \dfrac{2}{3} \end{bmatrix}$$

When converter is in the conduction states of six valve arms, at this time, $VTD_1$, $VTD_4$ and $VTD_5$ in the D-bridge converter are conducted, and $VTY_1$, $VTY_4$ and $VTY_5$ in the Y-bridge converter are conducted. Under these conduction states, the $A_{d6}$ and $A_{y6}$ are respectively as follow:

$$A_{d6} = \begin{bmatrix} \dfrac{k_d}{2L_r} & \dfrac{k_d}{2L_r} & 0 \\ \dfrac{k_d}{2L_r} & \dfrac{k_d}{2L_r} & 0 \\ 0 & 0 & \dfrac{k_d}{L_r} \end{bmatrix}$$

$$A_{y6} = \begin{bmatrix} \dfrac{k_y}{2L_r} & 0 & -\dfrac{k_y}{2L_r} \\ 0 & 0 & 0 \\ -\dfrac{k_y}{2L_r} & 0 & \dfrac{k_y}{2L_r} \end{bmatrix}$$

When converter is in the conduction states of seven valve arms, at this time, $VTD_1$, $VTD_4$ and $VTD_5$ in the D-bridge converter are conducted, and $VTY_1$, $VTY_4$, $VTY_5$ and $VTY_6$ in the Y-bridge converter are conducted. Under these conduction states, the $A_{d7}$ and $A_{y7}$ are respectively as follow:

$$A_{d7} = \begin{bmatrix} \dfrac{k_d}{2L_r} & \dfrac{k_d}{2L_r} & 0 \\ \dfrac{k_d}{2L_r} & \dfrac{k_d}{2L_r} & 0 \\ 0 & 0 & \dfrac{k_d}{L_r} \end{bmatrix}$$

-continued $$A_{y7} = \begin{bmatrix} \dfrac{2k_y}{3L_r} & -\dfrac{k_y}{3L_r} & -\dfrac{k_y}{3L_r} \\ -\dfrac{k_y}{3L_r} & \dfrac{2k_y}{3L_r} & -\dfrac{k_y}{3L_r} \\ -\dfrac{k_y}{3L_r} & -\dfrac{k_y}{3L_r} & \dfrac{2k_y}{3L_r} \end{bmatrix}$$

When converter is in the conduction states of eight valve arms, at this time, $VTD_1$, $VTD_4$, $VTD_5$ and $VTD_6$ in the D-bridge converter are conducted, and $VTY_1$, $VTY_4$, $VTY_5$ and $VTY_6$ in the Y-bridge converter are conducted. Under these conduction states, the $A_{d8}$ and $A_{y8}$ are respectively as follow:

$$A_{d8} = \begin{bmatrix} \dfrac{k_d}{L_r} & 0 & 0 \\ 0 & \dfrac{k_d}{L_r} & 0 \\ 0 & 0 & \dfrac{k_d}{L_r} \end{bmatrix}$$

$$A_{y8} = \begin{bmatrix} \dfrac{2k_y}{3L_r} & -\dfrac{k_y}{3L_r} & -\dfrac{k_y}{3L_r} \\ -\dfrac{k_y}{3L_r} & \dfrac{2k_y}{3L_r} & -\dfrac{k_y}{3L_r} \\ -\dfrac{k_y}{3L_r} & -\dfrac{k_y}{3L_r} & \dfrac{2k_y}{3L_r} \end{bmatrix}$$

Where $k_y$, $k_d$ are respectively the transformation ratio of Y-bridge converter and the transformation ratio of D-bridge converter; $L_r$ is the inductance converted from converter to valve side; $L_d$ is inductance of smoothing reactor; $u_{drec}$, $u_{drec2}$ are respectively voltage at DC line side of smoothing reactor in inverter station.

Step 304, according to the fault type, the current fed into AC system from the DC system and AC parameters, the virtual fault location and the virtual transition resistance are determined.

In the embodiment of the disclosure, the virtual fault location equation is determined according to the fault type, the current fed into the AC system by the DC system and the AC parameters. According to the virtual fault location equation, the virtual fault location and the virtual transition resistance are determined. The fault types include single-phase grounding fault, two-phase grounding fault, phase-to-phase fault and three-phase short-circuit fault. Fault type can be collected by fault phase selector.

Specifically, the transition resistance is a kind of transient resistance. The transition resistance is resistance of the passage of short circuit current flowing from one phase to another or from one phase to the grounding part when phase-to-phase short circuit or phase to ground short circuit of electrical equipment occurs. When phase-to-phase short circuit occurs, the transition resistance is mainly arc resistance. When grounding short circuit occurs, the transition resistance is mainly the tower and its grounding resistance. Once the fault disappears, the transition resistance also disappears.

In the embodiment of the disclosure, the fault location and transition resistance are solved according to the mathematical model of fault in AC line zone. The actual fault location with the calculated fault location is compared, and the actual transition resistance with the calculated transition resistance is compared, to determine whether the fault occurs in the AC line zone or outside the AC line zone. That is, when the calculated fault location and the calculated transition resistance are respectively consistent with the actual fault location and the actual transition resistance, the fault occurs in the AC line zone; when the calculated fault location and the calculated transition resistance are respectively inconsistent with the actual fault location and the actual transition resistance, the fault occurs outside the AC line zone. In view of the fact that the actual fault and the calculation results of the mathematical model used in the disclosure are not completely the same, therefore, for the convenience of description, the fault position and the transition resistance calculated by using the mathematical model of the fault in the AC line zone are defined as the virtual fault position and the virtual transition resistance.

As shown in FIG. 1, the circuit between the M side and N side is the protection circuit, that is, the M-N segment circuit. The circuit position is the ratio of the linear distance from any point on the M-N circuit to the M side to the total length of the M-N segment circuit. The fault type of circuit is divided into: single-phase grounding fault, two-phase grounding fault, phase-to-phase fault and three-phase short-circuit fault. For single-phase grounding fault:

The virtual fault location equation is expressed by equation 6:

$$p_1 + p_2 R_g + p_3 x + p_4 x^2 = 0 \qquad 6$$

Where $R_g$ is the virtual transition resistance, x is the virtual fault location, $p_1$, $p_2$, $p_3$, $p_4$ are respectively:

$$\begin{cases} p_1 = dL_0 \dfrac{du_{ma}}{dt} + L_{W0} \dfrac{du_{ma}}{dt} + dR_0 u_{ma} + R_{W0} u_{ma} \\ p_2 = 3\left(-dL_0 \dfrac{di_{m0}}{dt} - L_{W0} \dfrac{di_{m0}}{dt} - dR_0 i_{m0} - R_{W0} i_m + u_{m0}\right) \\ p_3 = -L_0 \dfrac{du_{ma}}{dt} - dL_0 L_l \dfrac{d^2 i_{ma}}{dt^2} - 3dk_L L_0 L_l \dfrac{d^2 i_{m0}}{dt^2} - \\ \qquad L_{W0} L_l \dfrac{d^2 i_{ma}}{dt^2} - 3k_L L_{W0} L_l \dfrac{d^2 i_{m0}}{dt^2} - dL_l R_0 \dfrac{di_{ma}}{dt} - \\ \qquad 3dk_L L_l R_0 \dfrac{di_{m0}}{dt} - dL_0 R_l \dfrac{di_{ma}}{dt} - 3dk_R L_0 R_l \dfrac{di_{m0}}{dt} - \\ \qquad L_{W0} R_l \dfrac{di_{ma}}{dt} - 3k_R L_{W0} R_l \dfrac{di_{m0}}{dt} - dR_0 R_l i_{ma} - \\ \qquad 3k_R dR_0 R_l i_{m0} - L_l R_{W0} \dfrac{di_{ma}}{dt} - 3k_L L_l R_{W0} \dfrac{di_{m0}}{dt} - \\ \qquad R_l R_{W0} i_{ma} - 3k_R R_l R_{W0} i_{m0} - R_0 u_{ma} \\ p_4 = L_0 L_l \dfrac{d^2 i_{ma}}{dt^2} + 3k_L L_0 L_l \dfrac{d^2 i_{m0}}{dt^2} + L_l R_0 \dfrac{di_{ma}}{dt} + \\ \qquad 3k_L L_l R_0 \dfrac{di_{m0}}{dt} + L_0 L_l \dfrac{di_{ma}}{dt} + 3k_R L_0 R_l \dfrac{di_{m0}}{dt} + \\ \qquad R_0 R_l i_{ma} + 3k_R R_0 R_l i_{m0} \end{cases}$$

Where d=1; $R_0$ and $L_0$ are respectively zero-sequence resistance and zero-sequence inductance of AC line; $R_{W0}$, $L_{W0}$ are respectively zero-sequence resistance and zero-sequence inductance of AC system at receiving end; $u_{m0}$ is zero-sequence voltage of AC line close to the DC system side; $i_{m0}$ is zero-sequence current of AC line close to the DC system side; $R_l$, $L_l$ are positive-sequence resistance and positive-sequence inductance of AC line respectively, $k_R = (R_0 - R_l)/(3R_l)$, $k_L = (L_0 - L_l)/(3L_l)$, the AC parameters include: $R_0$, $L_0$, $R_{W0}$, $L_{W0}$, $u_{m0}$, $i_{m0}$, $R_l$ and $L_l$; $u_{ma}$ is the voltage component of the corresponding converter bus in the case of the fault; $i_{ma}$ is the current component fed into the AC system by the corresponding DC system in the case of the fault.

With regard to the phase-to-phase fault, the virtual fault location equation is expressed by equation 7:

$$p_5 + p_6 R_g + p_7 x + p_8 x^2 = 0 \qquad 7$$

Where $R_g$ is the virtual transition resistance, x is the virtual fault location, $p_5$, $p_6$, $p_7$, $p_8$ are respectively:

$$\begin{cases} p_5 = 2dL_1 \dfrac{du_{mab}}{dt} + 2L_W \dfrac{du_{mab}}{dt} + 2dR_l u_{mab} 2R_W u_{mab} \\ p_6 = \Delta u_{mab} - dL_l \Delta \dfrac{di_{mab}}{dt} - L_W \Delta \dfrac{di_{mab}}{dt} - \\ \qquad d\Delta i_{mab} R_l - \Delta i_{mab} R_W \\ p_7 = -2L_l \dfrac{du_{mab}}{dt} - 2dL_l^2 \dfrac{d^2 i_{mab}}{dt^2} - 2L_W L_l \dfrac{d^2 i_{mab}}{dt^2} - 4dL_l R_l \dfrac{di_{mab}}{dt} - \\ \qquad 2L_W R_l \dfrac{di_{mab}}{dt} - 2dR_l^2 i_{mab} - 2L_l R_w \dfrac{di_{mab}}{dt} - 2R_l R_W i_{mab} - 2R_l u_{mab} \\ p_8 = 2L_l^2 \dfrac{d^2 i_{mab}}{dt^2} + 4L_l R_l \dfrac{di_{mab}}{dt} + 2R_l^2 i_{mab} \end{cases}$$

Where $u_{mab}$, $i_{mab}$ are the two-phase voltage difference value and current difference value of the AC line close to the DC system side respectively; $\Delta u_{mab}$, $\Delta i_{mab}$ are respectively the fault component of the two-phase voltage difference value and the fault component of the current difference value of the AC line near to the DC system side; $R_W$, $L_W$, are respectively the equivalent resistance and the equivalent inductance of the AC system at the receiving end, and the AC parameters include: $u_{mab}$, $i_{mab}$, $\Delta u_{mab}$, $R_W$, $L_W$, and $\Delta i_{mab}$; the $i_{mab}$ is calculated with the component of the current fed into the AC system by the DC system.

With regard to the two-phase grounding fault or three-phase short circuit fault, the virtual fault location equation is expressed by equation 8:

$$p_5+2p_6R_g+p_7x+p_8x^2=0 \qquad 8$$

The parameters in equation 7 are the same as those in equation 8.

In order to determine whether the fault location is on the M-N segment circuit, in the embodiment of the disclosure, current of multiple sampling points is collected within a preset sampling period. According to the fault location equation and current of each sampling point, the fault likeness factor is determined. According to the fault location equation and the current at the distance protection installation position, the threshold value of action is determined. When the fault likeness factor is not less than the threshold value of action, the fault occurs in the AC line zone, and the corresponding protection device is controlled to perform the corresponding protection action in the AC line zone. When the fault likeness factor is less than the threshold value of action, the fault occurs outside the AC line zone, and the corresponding protection device is controlled to perform the corresponding protection action outside the AC line zone.

The failure likeness factor is expressed by equation 9:

$$S_{hvdc} = \sum_{i=1}^{n} \frac{1}{|p_c(i) + p_{rg}(i)R_g + p_x(i)x + p_{x2}(i)x^2|} \qquad 9$$

Where $S_{hvdc}$ is the fault likeness factor; n is the number of sampling points in 10 ms; $p_c(i)$, $p_{rg}(i)$, $p_x(i)$ and $p_{x2}(i)$ are respectively the constant term, the coefficient before transition resistance term, the coefficient before the virtual fault location term and the coefficient before the square term of the virtual fault location in the virtual fault location equation calculated by using the actual fault data of the ith sampling point.

In the embodiment of the disclosure, the threshold value of action is a constant obtained based on the mathematical derivation of the fault equation, and the specific derivation process is as follows:

When fault occurs in the AC line zone, the virtual transition resistance and the virtual fault location are obtained by solving the virtual fault location equation under the fault condition, so equation 10 is established.

$$p_{cr}(i)+p_{rgr}(i)R_g+p_{xr}(i)x+p_{x2r}(i)x^2=0 \qquad 10$$

Where $p_{cr}(i)$, $p_{rgr}(i)$, $p_{xr}(i)$ and $p_{x2r}(i)$ are respectively the constant term, the coefficient before the transition resistance term, the coefficient before the virtual fault location term and the coefficient before the square term of the virtual fault location in the virtual fault location equation calculated by using infeed current.

Since the infeed current is calculated by using the mathematical model when the DC system is not in fault, and when the fault occurs in the AC line zone, fault is not in the DC system. Therefore, the infeed current is equal to the current at the distance protection installation site. At this time, equation 11 is established:

$$\begin{cases} p_{cr} = p_c \\ p_{rgr} = p_{rg} \\ p_{xr} = p_x \\ p_{x2r} = p_{x2} \end{cases} \qquad 11$$

According to equation 10 and equation 11, it can be seen that:

$$p_c(i)+p_{rg}(i)R_g+p_x(i)x+p_{x2}(i)x^2=0 \qquad 12$$

When the DC system outside the AC line is in fault, the virtual transition resistance and the virtual fault location are solved according to the virtual fault location equation under the fault condition, so equation 13 is established:

$$p_{cr}(i)+p_{rgr}(i)R_g+p_{xr}(i)x+p_{x2r}(i)x^2=0 \qquad 13$$

Since the infeed current is calculated by using the mathematical model of DC system without fault, when the fault occurs outside the AC line zone, the infeed current is not equal to the current at the distance protection installation position. At this time, equation 14 is established:

$$\begin{cases} p_{cr} \neq p_c \\ p_{rgr} \neq p_{rg} \\ p_{xr} \neq p_x \\ p_{x2r} \neq p_{x2} \end{cases} \qquad 14$$

According to equation 13 and equation 14, it can be seen that:

$$p_c(i)+p_{rg}(i)R_g+p_x(i)x+p_{x2}(i)x^2 \neq 0 \qquad 15$$

According to equation 12 and equation 15, when fault of AC line zone occurs, $p_c(i)+p_{rg}(i)R_g+p_x(i)x+p_{x2}(i)x^2=0$; if DC system outside AC line zone is in fault, $p_c(i)+p_{rg}(i)R_g+p_x(i)x+p_{x2}(i)x^2 \neq 0$, so faults in and out of AC line zone can be distinguished according to whether $p_c(i)+p_{rg}(i)R_g+p_x(i)x+p_{x2}(i)x^2$ is zero.

For the convenience of calculation, the absolute value of $p_c(i)+p_{rg}(i)R_g+p_x(i)x+p_{x2}(i)x^2$ is taken and recorded as A. Thus, the criterion becomes that A is equal to 0 when fault occurs in the AC line zone. When fault occurs outside the AC line zone, A is greater than 0. In the actual calculation process, a certain measurement error should be considered. Since the measurement error is usually a value range, and not a specific value, so as long as the absolute value of $p_c(i)+p_{rg}(i)R_g+p_x(i)x+p_{x2}(i)x^2$ is within the value range of measurement error, it can be regarded as the fault in AC line zone, then the criterion is adjusted that the value range of A is [0, a] when fault occurs in AC line zone. When the fault occurs outside the AC line zone, the value range of A is greater than a, where a is the maximum error. In the embodiment of the disclosure, a is 0.2n, that is, the calculation result of $p_c(i)+p_{rg}(i)R_g+p_x(i)x+p_{x2}(i)x^2$ is compared with 0.2n.

In the embodiment of the disclosure, $S_{hvdc}$ is equal to the sum of the n reciprocal of A, so the corresponding criterion is adjusted that $S_{hvdc}$ is no less than n/a in case of fault out of AC line zone, and $S_{hvdc}$ is less than n/a in case of fault out of AC line zone, and n/a is the threshold value of action. In the embodiment of the disclosure, the threshold value of action is set to 5.

Step 305, according to the current at the distance protection installation, virtual fault position and virtual transition resistance, the corresponding protection device is controlled to perform the protection action.

In the embodiment of the disclosure, when the fault in the AC line zone is determined according to the virtual fault location and virtual transition resistance, the breaker of AC line jumps off and cuts off the line fault. When the fault outside the AC line zone is determined according to the virtual fault location and virtual transition resistance, the breaker of AC line will not trip.

As an example, the disclosure provides the following embodiments to illustrate that the method provided by the above embodiment of the disclosure can solve the technical problems raised in the background technology of the disclosure.

The First Embodiment

Phase A-to-ground fault and phase AB-to-ground fault are set at 50% line length from bus M on AC line M-N respectively, the transition resistance varies between 0Ω and 300Ω.

When there is no fault in AC/DC hybrid power grid, Y-bridge and D-bridge converters can commutate normally, as shown in FIG. 2. Suppose at t=0 ms, $VTY_1$ and $VTY_2$ in Y-bridge converter and $VTD_1$ and $VTD_2$ in D-bridge converter are conducted. Under the action of triggering signals provided to $VTY_3$ in the Y-bridge converter and $VTD_3$ in the D-bridge converter, commutation will take place in Y-bridge converter and D-bridge converter successively. When the voltage that $VTD_1$ in D-bridge converter bears first is changed from negative to positive and is restored to its cutoff capability, the commutation in Y-bridge converter and D-bridge converter is finished. In the new conducting state, $VTY_2$ and $VTY_3$ in Y-bridge converter and $VTD_2$ and $VTD_3$ in D-bridge converter are conducted.

Phase A-to-ground fault and phase AB-to-ground fault occurs at 50% line length from bus M on AC line M-N respectively. At t=0 ms, $VTY_1$ and $VTY_2$ in the Y-bridge converter and $VTD_1$ and $VTD_2$ in the D-bridge converter are conducted. Under the action of triggering signals provided to $VTY_3$ in the Y-bridge converter and $VTD_3$ in the D-bridge converter, commutation will take place in Y-bridge converter and D-bridge converter successively. When the voltage that $VTD_1$ in the D-bridge converter bears first changes from negative to positive, the conducting states in the Y-bridge converter and D-bridge converter are shown in Table 1.

tation, commutation failure occurs in Y-bridge converter. When phase A-to-ground fault occurs and the transition resistance varies between 150Ω and 300Ω, the conducting state of converters are the same as the conducting state in the case of normal operation, it is judged that both Y-bridge converter and D-bridge converter commutate normally. When phase AB-to-ground fault occurs, it is similar to analysis procedure of phase A-to-ground fault, and it can be seen that commutation failure occurs in inverter-side converter when the transition resistance varies between 0Ω and 50Ω; both Y-bridge converter and D-bridge converter commutate normally when the transition resistance varies between 100Ω and 300Ω. The virtual fault location and fault likeness factor corresponding to the above two fault types are shown in FIG. 4a-4d.

Figure 4A:
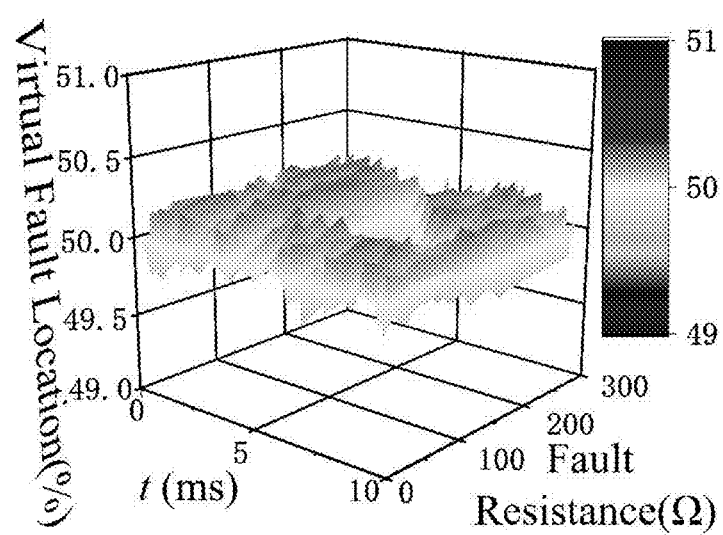
FIG. 4a is a schematic diagram of virtual fault position change during Phase A-to-ground fault provided by embodiment of present disclosure.
Figure 4B:
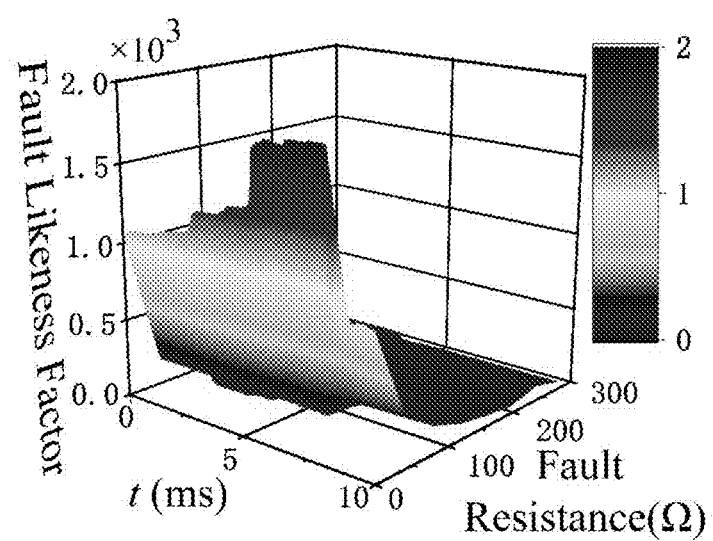
Figure 4C:
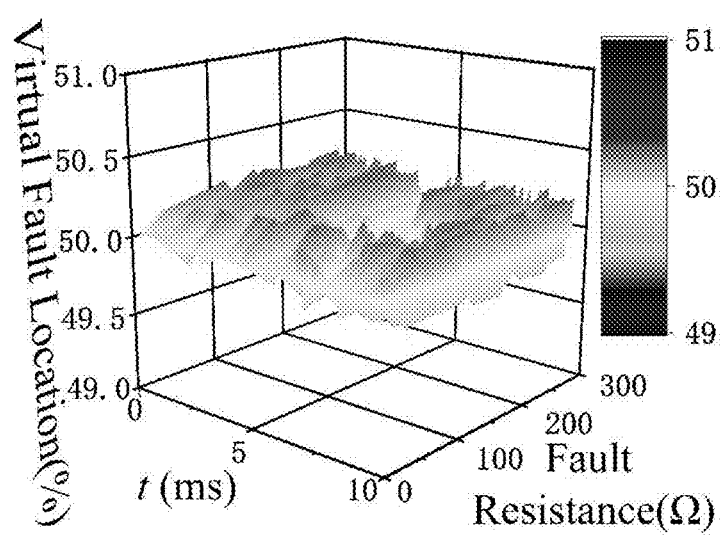
FIG. 4c is a schematic diagram of virtual fault position change during phase AB-to-ground fault provided by embodiment of present disclosure.

It can be seen from FIGS. 4a and 4c that, the calculation results of virtual fault location in different fault cases are all close to 50%. The relative error of location slightly fluctuates as the transition resistance increases, but remains below 0.18%, thus the locating result is accurate. The locating error mainly comes from an error introduced by substituting the differential method with difference method.

Figure 4D:
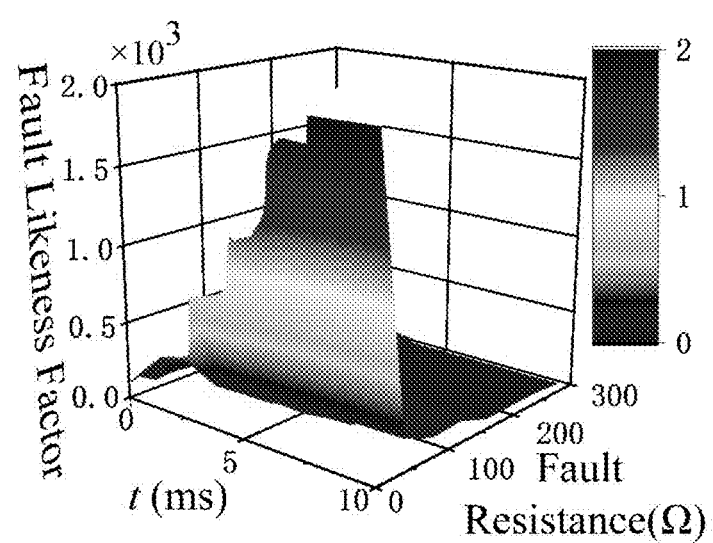
FIG. 4d is a schematic diagram of the change of the fault likeness factor during the phase AB-to-ground fault corresponding to FIG. 4c.

It can be seen from FIGS. 4b and 4d that, in different fault cases, as the transition resistance increases, the values of fault likeness factors at the same time section all decrease. When phase A-to-ground fault occurs and the transition resistance is 300Ω, the fault likeness factor first increases and then decreases as the time window slides, as shown in FIG. 4b. The minimum value of fault likeness factor 38.21 appears at t=3.85 ms, which is much larger than the threshold value of action. When phase AB-to-ground fault occur and the transition resistance is 300Ω, the minimum value of fault likeness factor 44.51 appears at t=4 ms, as shown in FIG. 4d.

According to FIG. 4a-4d, the virtual fault location is consistent with the actual fault location in the case of the above two fault types, and the fault likeness factor is bigger

TABLE 1

Conducting states of converters in the case of phase A fault and phase A-to-phase B fault in AC line going through different transition resistances

| | Phase A-to-ground fault | | | Phase AB-to-ground fault | | |
|---|---|---|---|---|---|---|
| Transition resistance (Ω) | Conducted valves in Y-bridge converter | Conducted valves in D-bridge converter | Is there commutation failure? | Conducted valves in Y-bridge converter | Conducted valves in D-bridge converter | Is there commutation failure? |
| 0 | $VTY_1$, $VTY_2$ | $VTD_1$, $VTD_2$ | Yes | $VTY_1$, $VTY_2$ | $VTD_1$, $VTD_2$ | Yes |
| 50 | $VTY_1$, $VTY_2$ | $VTD_2$, $VTD_3$ | Yes | $VTY_1$, $VTY_2$ | $VTD_2$, $VTD_3$ | Yes |
| 100 | $VTY_1$, $VTY_2$ | $VTD_2$, $VTD_3$ | Yes | $VTY_2$, $VTY_3$ | $VTD_2$, $VTD_3$ | No |
| 150 | $VTY_2$, $VTY_3$ | $VTD_2$, $VTD_3$ | No | $VTY_2$, $VTY_3$ | $VTD_2$, $VTD_3$ | No |
| 200 | $VTY_2$, $VTY_3$ | $VTD_2$, $VTD_3$ | No | $VTY_2$, $VTY_3$ | $VTD_2$, $VTD_3$ | No |
| 250 | $VTY_2$, $VTY_3$ | $VTD_2$, $VTD_3$ | No | $VTY_2$, $VTY_3$ | $VTD_2$, $VTD_3$ | No |
| 300 | $VTY_2$, $VTY_3$ | $VTD_2$, $VTD_3$ | No | $VTY_2$, $VTY_3$ | $VTD_2$, $VTD_3$ | No |

It can be seen from Table 1 that, when phase A-to-ground fault occurs on AC line and the transition resistance is 50Ω, $VTD_2$ and $VTD_3$ in D-bridge converter are conducted, while $VTY_1$ and $VTY_2$ in Y-bridge converter are conducted, compared with conducting state in the case of normal commuthan the threshold value. Thus it is judged that the fault occurs at 50% line length from bus M on AC line M-N zone, and distance protection will operate correctly. Based on the above analysis, when fault in AC line zone goes through different transition resistances, the method is highly sensitive and can quickly identify the fault, and is unaffected by the commutation failure and fault type.

The Second Embodiment

Phase A-to-ground fault and phase A-to-phase B fault are set at different locations in AC line zone respectively, and the transition resistance is 300Ω when the phase A-to-ground fault occurs.

At t=0 ms, $VTY_1$ and $VTY_2$ in Y-bridge converter and $VTD_1$ and $VTD_2$ in D-bridge converter are conducted. Under action of triggering signals provided to $VTY_3$ in Y-bridge converter and $VTD_3$ in D-bridge converter, commutation will take place in Y-bridge converter and D-bridge converter successively. When the voltage that $VTD_1$ in D-bridge converter bears first changes from negative to positive, the conducting states of Y-bridge converter and D-bridge converter are shown in Table 2.

TABLE 2

Conducting states of converters when phase A-to-ground fault and phase A-to-phase B fault occur at different locations on AC line

| Fault location | Phase A-to-ground fault | | | Phase A-to-phase B fault | | |
|---|---|---|---|---|---|---|
| | Conducted valves in Y-bridge converter | Conducted valves in D-bridge converter | Is there commutation failure? | Conducted valves in Y-bridge converter | Conducted valves in D-bridge converter | Is there commutation failure? |
| 20% | $VTY_1$, $VTY_2$ | $VTD_1$, $VTD_2$ | Yes | $VTY_1$, $VTY_2$ | $VTD_2$, $VTD_3$ | Yes |
| 40% | $VTY_1$, $VTY_2$ | $VTD_2$, $VTD_3$ | Yes | $VTY_1$, $VTY_2$ | $VTD_2$, $VTD_3$ | Yes |
| 60% | $VTY_2$, $VTY_3$ | $VTD_2$, $VTD_3$ | No | $VTY_1$, $VTY_2$ | $VTD_2$, $VTD_3$ | Yes |
| 80% | $VTY_2$, $VTY_3$ | $VTD_2$, $VTD_3$ | No | $VTY_1$, $VTY_2$ | $VTD_2$, $VTD_3$ | Yes |
| 95% | $VTY_2$, $VTY_3$ | $VTD_2$, $VTD_3$ | No | $VTY_1$, $VTY_2$ | $VTD_2$, $VTD_3$ | Yes |

It can be seen from Table 2 that, the cutoff capability of $VTY_1$ in Y-bridge converter cannot be restored during reverse voltage when phase A-to-phase B fault occurs at any location on AC line, thus it can be judged that commutation failure occurs in Y-bridge converter. When the commutation from $VTD_1$ to $VTD_3$ in D-bridge converter is finished, $VTD_2$ and $VTD_3$ in D-bridge converter are conducted, and $VTY_1$ and $VTY_2$ in Y-bridge converter are conducted. It is similar to analysis procedure of phase A-to-phase B fault, when phase A-to-ground fault occurs and the fault location varies between 20% and 40%, commutation failure occurs in inverter-side converter; both Y-bridge converter and D-bridge converter commutate normally when the fault location varies between 60% and 95%. The virtual fault location and fault likeness factor in the above two fault cases are shown in FIG. 5a-5d.

Figure 5A:
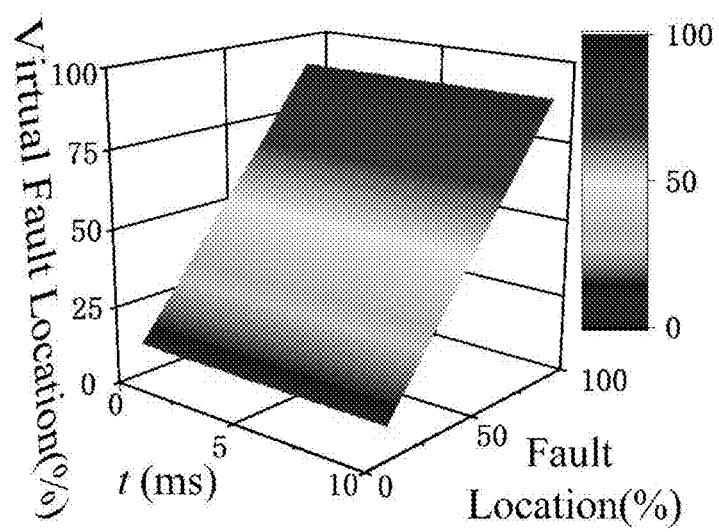
FIG. 5a is a schematic diagram of virtual fault position change during another Phase A-to-ground fault provided by embodiment of present disclosure.
Figure 5B:
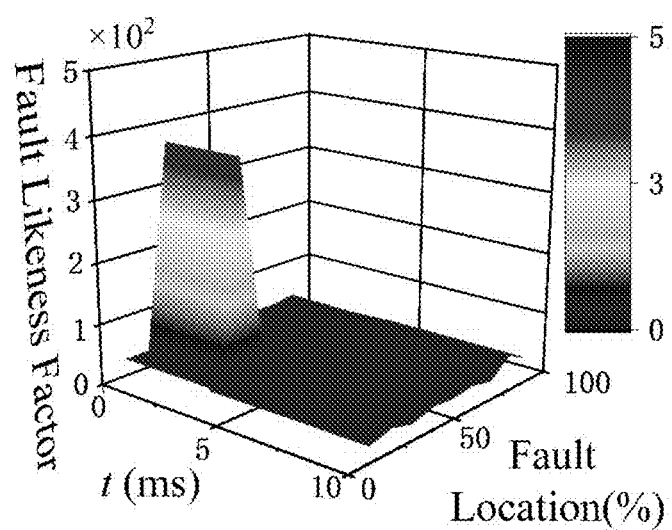
Figure 5C:
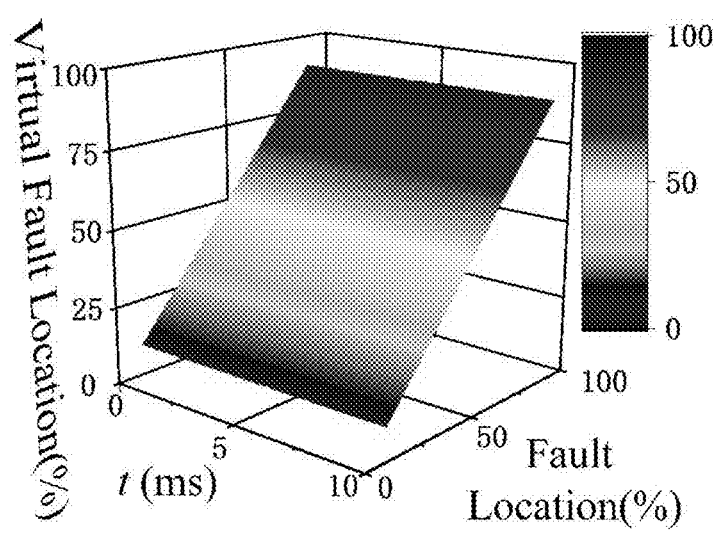
FIG. 5c is a schematic diagram of virtual fault position change during another phase A-to-phase B fault provided by embodiment of present disclosure.

It can be seen from FIGS. 5a and 5c that the simulation results of time, actual fault distance percentage and the virtual fault location form a 45° slanted plane, it means the actual fault distance and the virtual fault location at different time sections are consistent, and the relative error of location increases as the actual fault distance increases. When phase A-to-ground fault occurs at 90% line length from bus M, the relative error of location reaches the maximum value 0.16%.

Figure 5D:
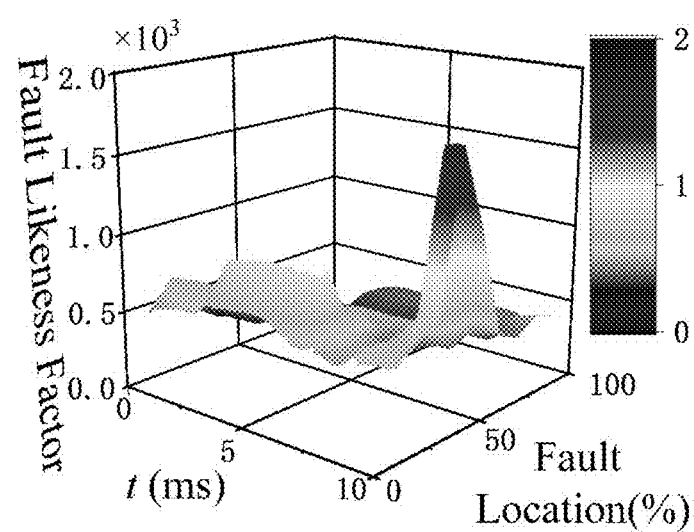
FIG. 5d is a schematic diagram of the change of the fault likeness factor during the phase A-to-phase B fault corresponding to FIG. 5c.

It can be seen from FIGS. 5b and 5d that, the fault likeness factors in different fault cases are bigger than the threshold value, which is consistent with the conclusion of Table 2. When fault occurs at any location on AC line, as percentage of the actual fault distance increases, the fault likeness factors at the same time section all first increase and then decrease. When phase A-to-ground fault occurs at 40% line length from bus M, the minimum value of fault likeness factor 27.11 appears at t=3.85 ms, as shown in FIG. 5b. When phase A-to-phase B fault occurs at 90% line length from bus M, the minimum value of fault likeness factor 80.37 appears at t=0 ms, as shown in FIG. 5d.

In the above two fault cases, the virtual fault locations are the same as the actual fault locations, and the fault likeness factors are all bigger than the threshold value, thus it is identified as faults occurs in AC line M-N zone, and distance protection will operate correctly. According to the above analysis, the proposed protection criterion is not affected by the fault location and commutation failure, and is high sensitivity even when fault occurs at the end of line.

The Third Embodiment

Phase A-to-ground fault is set at $f_1$ in FIG. 2, the transition resistance varies between 0Ω and 300Ω.

At t=0 ms, $VTY_1$ and $VTY_2$ in Y-bridge converter and $VTD_1$ and $VTD_2$ in D-bridge converter are conducted. Under action of triggering signals provided to $VTY_3$ in Y-bridge converter and $VTD_3$ in D-bridge converter, commutation will take place in Y-bridge converter and D-bridge converter successively. When the voltage that $VTD_1$ in D-bridge converter bears first changes from negative to positive, the conducting state of Y-bridge converter and D-bridge converter are shown in Table 3.

TABLE 3

Conducting states of converters when fault occurs in DC system at back side of AC line

| Transition resistance (Ω) | Conducted valves in Y-bridge converter | Conducted valves in D-bridge converter | Is there commutation failure? |
|---|---|---|---|
| 0 | $VTY_1$, $VTY_2$ | $VTD_2$, $VTD_3$ | Yes |
| 50 | $VTY_2$, $VTY_3$ | $VTD_2$, $VTD_3$ | No |
| 100 | $VTY_2$, $VTY_3$ | $VTD_2$, $VTD_3$ | No |
| 150 | $VTY_2$, $VTY_3$ | $VTD_2$, $VTD_3$ | No |
| 200 | $VTY_2$, $VTY_3$ | $VTD_2$, $VTD_3$ | No |
| 250 | $VTY_2$, $VTY_3$ | $VTD_2$, $VTD_3$ | No |
| 300 | $VTY_2$, $VTY_3$ | $VTD_2$, $VTD_3$ | No |

Figure 6A:
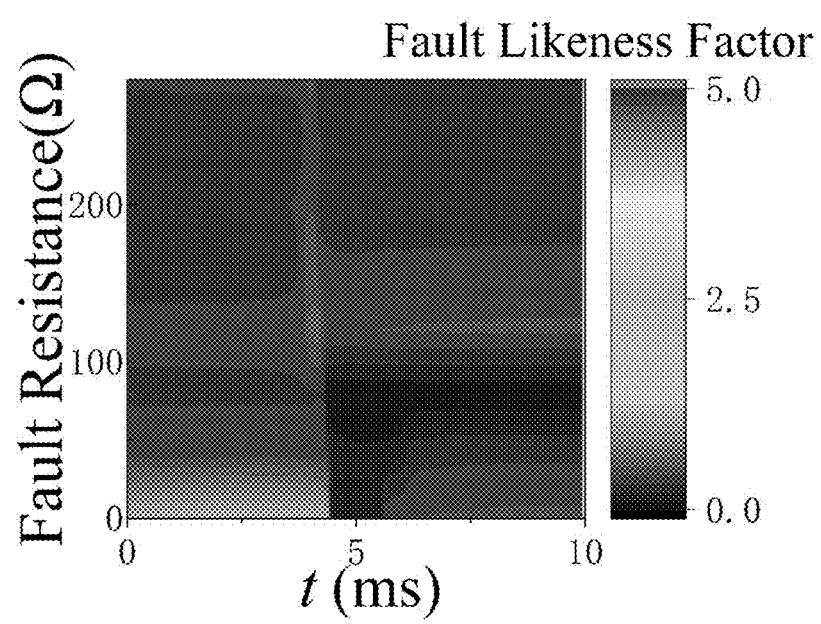
FIG. 6a is a contour chart of the fault likeness factor during Phase A-to-ground fault provided by embodiment of present disclosure.
Figure 6B:
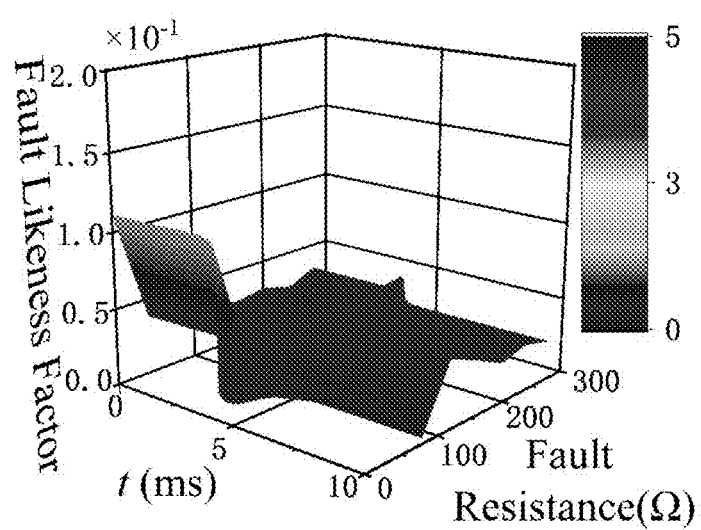

It can be seen from Table 3 that, when the transition resistance is 01, the cutoff capability of $VTY_1$ in Y-bridge converter cannot be restored during reverse voltage, thus commutation failure occurs in Y-bridge converter. When the transition resistance varies between 50Ω and 300Ω, the conducting states of Y-bridge converter and D-bridge converter are the same as the conducting states in normal operation, it is judged that Y-bridge converter and D-bridge converter both commutate normally. The fault likeness factor in the above fault case is shown in FIG. 6a-6b.

It can be seen from FIG. 6a that, in this fault case, as the transition resistance increases, the fault likeness factors at different time sections fluctuate slightly but remain below the threshold value. According to FIG. 6b, when the transition resistance is 0Ω, the maximum value of fault likeness factor 0.11 appears at t=3.45 ms, which is much smaller than the threshold value of action, it is identified that fault in AC line M-N zone does not occur, and distance protection will not operate. According to the above analysis, the proposed protection criterion of present disclosure can correctly distinguish between internal and external faults, unaffected by the commutation failure.

In conclusion, the method and system for AC line distance protection in AC/DC hybrid power grid based on fault likeness factor constructed by the disclosure can quickly and reliably identify internal and external faults in the case of commutation failure caused by different types of faults at different locations of AC lines, and has strong resistance to transition resistance.

Figure 7:
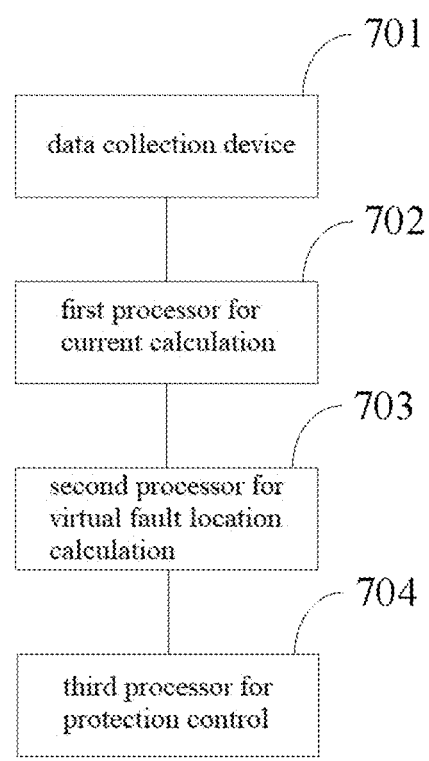
FIG. 7 is a structure diagram of system for AC line distance protection in AC/DC hybrid power grid provided by embodiment of present disclosure.

As shown in FIG. 7, the embodiment of the disclosure provides a system for AC line distance protection in AC/DC hybrid power grid including: data collection device 701, first processor for current calculation 702, second processor for virtual fault location calculation 703 and third processor for protection control 704. Each of the first processor, the second processor and the third processor is independent processor, or all processors are integrated in a single processor.

The data collection device 701 is used to collect the operation parameters of inverter-side converter, AC parameters, converter bus voltage, current at distance protection installation and operation parameters of smoothing reactor of inverter station.

The first processor for current calculation 702 is used to determine the conduction state of the inverter-side converter according to the operation parameters of the inverter-side converter; According to the operation parameters of the inverter-side converter, the operation parameters of the smoothing reactor of the inverter station and the converter bus voltage, the current fed into the AC system from the DC system corresponding to the conduction state is determined.

The second processor for virtual fault location calculation 703 is used to determine the virtual fault position and the virtual transition resistance according to the fault type, the current fed into the AC system from the DC system and the AC parameters.

The third processor for protection control 704 is used to control the corresponding protection device to perform the protection action according to the current at the distance protection installation position, the virtual fault position and the virtual transition resistance.

The inverter-side converter is a 12-pulse converter, and the operation parameters of the inverter-side converter comprise the conduction state parameters of each valve arm in the 12-pulse converter; the first processor for current calculation configured to: determine that the inverter-side converter is in the conduction states of four valve arms, five valve arms, six valve arms, seven valve arms or eight valve arms according to the conduction state parameters of each valve arm in the 12-pulse converter.

The first processor for current calculation configured that: equation 1 is used to determine the current fed into the AC system by the DC system corresponding to the conduction states of the four valve arms:

$$I = \int [(K_d A_{d4} + K_y A_{y4})U - K_d D_{d4} - K_y D_{y4}]dt + f_{icom}(U) \qquad 1$$

equation 2 is used to determine the current fed into the AC system by the DC system corresponding to the conduction states of the five valve arms:

$$I = \int [(K_y A_{i5}^{-1}(A_{g5} + A_{d5}) + K_d A_{d5}]Udt - \int (K_y A_{i5}^{-1} + K_d) D_{d5} dt + f_{icom}(U) \qquad 2$$

equation 3 is used to determine the current fed into the AC system by the DC system corresponding to the conduction states of the six valve arms:

$$I = \int [-(K_d A_{d6} + K_y A_{y6})U]dt + f_{icom}(U) \qquad 3$$

equation 4 is used to determine the current fed into the AC system by the DC system corresponding to the conduction states of the seven valve arms:

$$I = \int [-(K_d A_{d7} + K_y A_{y7})U]dt + f_{icom}(U) \qquad 4$$

equation 5 is used to determine the current fed into the AC system by the DC system corresponding to the conduction states of the eight valve arms:

$$I = \int [-(K_d A_{d8} + K_y A_{y8})U]dt + f_{icom}(U) \qquad 5$$

where, $D_{d4}$, $D_{y4}$, $A_{d4}$, $A_{y4}$ are respectively the parameter matrixes under the conduction states of the four valve arms; $D_{d5}$, $A_{d5}$, $A_{g5}$, $A_{i5}$ are respectively the parameter matrixes under the conduction states of the five valve arms; $A_{d6}$, $A_{y6}$ are respectively the parameter matrixes under the conduction states of the six valve arms; $A_{d7}$, $A_{y7}$ are respectively the parameter matrixes under the conduction states of the seven valve arms; $A_{d8}$, $A_{y8}$ are respectively the parameter matrixes under the conduction states of the eight valve arms; $f_{icom}(U)$, which is the current that flows through AC filter and reactive power compensation device, is the function of converter bus voltage when the parameters of AC filter and reactive power compensation device are fixed; U is the voltage matrix of the converter bus; I is the current matrix fed into the AC system from the DC system; $K_y$ is the transformation matrix of the Y-bridge converter and $K_d$ is the transformation matrix of the D-bridge converter; wherein the 12-pulse converter comprises: the Y-bridge converter and the D-bridge converter.

The second processor for virtual fault location calculation configured to: determine the virtual fault position equation according to the fault type, the current fed into the AC system from the DC system and the AC parameters; determine the virtual fault position and the virtual transition resistance according to the virtual fault position equation.

The second processor for virtual fault location calculation configured that: when the fault type is single-phase to ground fault, the virtual fault location equation is determined by equation 6:

$$p_1 + p_2 R_g + p_3 x + p_4 x^2 = 0 \qquad 6$$

where $R_g$ is the virtual transition resistance, x is the virtual fault location, $p_1$, $p_2$, $p_3$, $p_4$ are respectively:

$$\begin{cases} p_1 = dL_0 \dfrac{du_{ma}}{dt} + L_{W0} \dfrac{du_{ma}}{dt} + dR_0 u_{ma} + R_{W0} u_{ma} \\ p_2 = 3\left(-dL_0 \dfrac{di_{m0}}{dt} - L_{W0} \dfrac{di_{m0}}{dt} - dR_0 i_{m0} - R_{W0} i_{m0} + u_{m0}\right) \\ p_3 = -L_0 \dfrac{du_{ma}}{dt} - dL_0 L_l \dfrac{d^2 i_{ma}}{dt^2} - 3dk_L L_0 L_l \dfrac{d^2 i_{m0}}{dt^2} - \\ \quad L_{W0} L_l \dfrac{d^2 i_{ma}}{dt^2} - 3k_L L_{W0} L_l \dfrac{d^2 i_{m0}}{dt^2} - dL_l R_0 \dfrac{di_{ma}}{dt} - \\ \quad 3dk_L L_l R_0 \dfrac{di_{m0}}{dt} - dL_0 R_l \dfrac{di_{ma}}{dt} - 3dk_R L_0 R_l \dfrac{di_{m0}}{dt} - \\ \quad L_{W0} R_l \dfrac{di_{ma}}{dt} - 3k_R L_{W0} R_l \dfrac{di_{m0}}{dt} - dR_0 R_l i_{ma} - \\ \quad 3k_R dR_0 R_l i_{m0} - L_l R_{W0} \dfrac{di_{ma}}{dt} - 3k_L L_l R_{W0} \dfrac{di_{m0}}{dt} - \\ \quad R_l R_{W0} i_{ma} - 3k_R R_l R_{W0} i_{m0} - R_0 u_{ma} \\ p_4 = L_0 L_l \dfrac{d^2 i_{ma}}{dt^2} + 3k_L L_0 L_l \dfrac{d^2 i_{m0}}{dt^2} + L_l R_0 \dfrac{di_{ma}}{dt} + \\ \quad 3k_L L_l R_0 \dfrac{di_{m0}}{dt} + L_0 L_l \dfrac{di_{ma}}{dt} + 3k_R L_0 R_l \dfrac{di_{m0}}{dt} + \\ \quad R_0 R_l i_{ma} + 3k_R R_0 R_l i_{m0} \end{cases}$$

where, d=1; $R_0$ and $L_0$ are respectively zero-sequence resistance and zero-sequence inductance of AC line; $R_{W0}$, $L_{W0}$ are respectively zero-sequence resistance and zero-sequence inductance of AC system at receiving end; $u_{m0}$ is zero-sequence voltage of AC line close to DC system side; $i_{m0}$ is zero-sequence current of AC line close to the DC system side; $R_l$, $L_l$ are positive-sequence resistance and positive-sequence inductance of AC line respectively, $k_R$=$(R_0-R_l)/(3R_l)$, $k_L$=$(L_0-L_l)/(3L_l)$, the AC parameters comprise: $R_0$, $L_0$, $R_{W0}$, $L_{W0}$, $u_{m0}$, $i_{m0}$, $R_l$ and $L_l$; $u_{ma}$ is the voltage component of the corresponding converter bus in the case of the fault; $i_{ma}$ is the current component fed into the AC system by the corresponding DC system in the case of the fault.

The second processor for virtual fault location calculation configured that: when the fault type is phase-to-phase fault, the virtual fault location equation is expressed by equation 7:

$$p_5+p_6R_g+p_7x+p_8x^2=0 \qquad 7$$

where $R_g$ is the virtual transition resistance, x is the virtual fault location, $p_5$, $p_6$, $p_7$, $p_8$ are respectively:

$$\begin{cases} p_5 = 2dL_1\frac{du_{mab}}{dt} + 2L_W\frac{du_{mab}}{dt} + 2dR_l u_{mab} \, 2R_W u_{mab} \\ p_6 = \Delta u_{mab} - dL_l\Delta\frac{di_{mab}}{dt} - L_W\Delta\frac{di_{mab}}{dt} - \\ \qquad d\Delta i_{mab}R_l - \Delta i_{mab}R_W \\ p_7 = -2L_l\frac{di_{mab}}{dt} - 2dL_l^2\frac{d^2 i_{mab}}{dt^2} - 2L_W L_l\frac{d^2 i_{mab}}{dt^2} - 4dL_l R_l\frac{di_{mab}}{dt} - \\ \qquad 2L_W R_l\frac{di_{mab}}{dt} - 2dR_l^2 i_{mab} - 2L_l R_w\frac{di_{mab}}{dt} - 2R_l R_W i_{mab} - 2R_l u_{mab} \\ p_8 = 2L_l^2\frac{d^2 i_{mab}}{dt^2} + 4L_l R_l\frac{di_{mab}}{dt} + 2R_l^2 i_{mab} \end{cases}$$

where $u_{mab}$, $i_{mab}$ are the two-phase voltage difference value and current difference value of the AC line close to the DC system side respectively; $\Delta u_{mab}$, $\Delta i_{mab}$ are respectively the fault component of the two-phase voltage difference value and the fault component of the current difference value of the AC line near to the DC system side; $R_w$, $L_w$ are respectively the equivalent resistance and the equivalent inductance of the AC system at the receiving end, and the AC parameters comprise: $u_{mab}$, $i_{mab}$, $\Delta u_{mab}$, $R_w$, $L_w$ and $\Delta i_{mab}$; the $i_{mab}$ is calculated with the component of the current fed into the AC system from the DC system.

The second processor for virtual fault location calculation configured that: when the fault type is two-phase grounding fault or three-phase short circuit fault, the virtual fault location equation is expressed by equation 8:

$$p_5+2p_6R_g+p_7x+p_8x^2=0 \qquad 8$$

The third processor for protection control configured to: determine the fault likeness factor according to the virtual fault location, the virtual transition resistance, the fault location equation and the current at the distance protection installation position; determine the fault in the AC line zone when the fault likeness factor is not less than the preset threshold value of action, and controlling the corresponding protection device to perform the corresponding protection action in the AC line zone; determine the fault out of the AC line zone when the fault likeness factor is less than the threshold value, and controlling the corresponding protection device to perform the corresponding protection action outside the AC line zone.

The system according to claim 18, wherein the third processor for protection control configured that: the fault likeness factor is expressed by equation 9:

$$S_{hvdc} = \sum_{i=1}^{n}\frac{1}{|p_c(i) + p_{rg}(i)R_g + p_x(i)x + p_{x2}(i)x^2|} \qquad 9$$

where $S_{hvdc}$ is the fault likeness factor; n is the number of sampling points in 10 ms; $p_c(i)$, $p_{rg}(i)$, $p_x(i)$ and $p_{x2}(i)$ are respectively the constant term, the coefficient before transition resistance term, the coefficient before the virtual fault location term and the coefficient before the square term of the virtual fault location in the virtual fault location equation calculated by using the actual fault data of the ith sampling point.

A non-transitory machine-readable storage medium comprising instructions that when executed cause a processor of a computing device to: collecting operation parameters of inverter-side converter, AC parameters, converter bus voltage, current of distance protection installation and operation parameters of smoothing reactor of inverter station; determining conduction state of the inverter-side converter according to the operation parameters of the inverter-side converter; determining current fed into the AC system from the DC system corresponding to the conduction state according to the operation parameters of the inverter-side converter, the operation parameters of the smoothing reactor of the inverter station and the converter bus voltage; determining a virtual fault location and a virtual transition resistance according to a fault type, the current fed into the AC system from the DC system and the AC parameters; controlling a corresponding protection device to perform protection action according to the current at the distance protection installation, the virtual fault location and the virtual transition resistance.

It should be noted that the system for AC line distance protection in AC/DC hybrid power grid in FIG. 7 can implement the method for AC line distance protection in AC/DC hybrid power grid provided by any of the above embodiments.

It can be understood by those skilled in the art that the whole or part of the process of realizing the method in the above embodiment can be completed by instructing relevant hardware through a computer program, and the program can be stored in a computer-readable storage medium. The computer-readable storage medium is a disk, an optical disk, a read-only memory or a random storage memory, etc.

The above is only a better specific embodiment of the disclosure, but the protection scope of the disclosure is not limited to this. Any change or replacement that can be easily thought of by any technical personnel familiar with the technical field within the technical scope disclosed by the disclosure shall be included in the protection scope of the disclosure.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical disclosure, to thereby enable others skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. A method for AC line distance protection in AC/DC hybrid power grid, comprising:
   collecting operation parameters of inverter-side converter, AC parameters, converter bus voltage, current of distance protection installation and operation parameters of smoothing reactor of inverter station;
   determining conduction state of the inverter-side converter according to the operation parameters of the inverter-side converter;
   determining current fed into the AC system from the DC system corresponding to the conduction state according to the operation parameters of the inverter-side converter, the operation parameters of the smoothing reactor of the inverter station and the converter bus voltage;
   determining a virtual fault location and a virtual transition resistance according to a fault type, the current fed into the AC system from the DC system and the AC parameters;
   controlling a corresponding protection device to perform protection action according to the current at the distance protection installation, the virtual fault location and the virtual transition resistance.

2. The method according to claim 1, wherein the inverter-side converter is a 12-pulse converter, and the operation parameters of the inverter-side converter comprise the conduction state parameters of each valve arm in the 12-pulse converter;
   wherein determining the conduction state of the inverter-side converter according to the operation parameters of the inverter-side converter comprises:
   determining that the inverter-side converter is in the conduction states of four valve arms, five valve arms, six valve arms, seven valve arms or eight valve arms according to the conduction state parameters of each valve arm in the 12-pulse converter.

3. The method according to claim 1,
   wherein determining current fed into the AC system from the DC system corresponding to the conduction state according to the operation parameters of the inverter-side converter, the operation parameters of the smoothing reactor of the inverter station and the converter bus voltage comprises specifically as follows:
   equation 1 is used to determine the current fed into the AC system by the DC system corresponding to the conduction states of the four valve arms:

$$I=\int[(K_d A_{d4}+K_y A_{y4})U-K_d D_{d4}-K_y D_{y4}]dt+f_{icom}(U) \quad 1$$

equation 2 is used to determine the current fed into the AC system by the DC system corresponding to the conduction states of the five valve arms:

$$I=\int[K_y A_{i5}^{-1}(A_{g5}+A_{d5})+K_d A_{d5}]Udt-\int(K_y A_{i5}^{-1}+K_d)D_{d5}dt+f_{icom}(U) \quad 2$$

equation 3 is used to determine the current fed into the AC system by the DC system corresponding to the conduction states of the six valve arms:

$$I=\int[-(K_d A_{d6}+K_y A_{y6})U]dt+f_{icom}(U) \quad 3$$

equation 4 is used to determine the current fed into the AC system by the DC system corresponding to the conduction states of the seven valve arms:

$$I=\int[-(K_d A_{d7}+K_y A_{y7})U]dt+f_{icom}(U) \quad 4$$

equation 5 is used to determine the current fed into the AC system by the DC system corresponding to the conduction states of the eight valve arms:

$$I=\int[-(K_d A_{d8}+K_y A_{y8})U]dt+f_{icom}(U) \quad 5$$

where, $D_{d4}$, $D_{y4}$, $A_{d4}$, $A_{y4}$ are respectively the parameter matrixes under the conduction states of the four valve arms; $D_{d5}$, $A_{d5}$, $A_{g5}$, $A_{i5}$ are respectively the parameter matrixes under the conduction states of the five valve arms; $A_{d6}$, $A_{y6}$ are respectively the parameter matrixes under the conduction states of the six valve arms; $A_{d7}$, $A_{y7}$ are respectively the parameter matrixes under the conduction states of the seven valve arms; $A_{d8}$, $A_{y8}$ are respectively the parameter matrixes under the conduction states of the eight valve arms; $f_{icom}(U)$, which is the current that flows through AC filter and reactive power compensation device, is the function of converter bus voltage when the parameters of AC filter and reactive power compensation device are fixed; U is the voltage matrix of the converter bus; I is the current matrix fed into the AC system from the DC system; $K_y$ is the transformation matrix of the Y-bridge converter and $K_d$ is the transformation matrix of the D-bridge converter; wherein the 12-pulse converter comprises: the Y-bridge converter and the D-bridge converter.

4. The method according to claim 1,
wherein determining the virtual fault location and the virtual transition resistance according to the fault type, the current fed into the AC system from the DC system and the AC parameters comprises:
determining the virtual fault position equation according to the fault type, the current fed into the AC system from the DC system and the AC parameters;
determining the virtual fault position and the virtual transition resistance according to the virtual fault position equation.

5. The method according to claim 4,
wherein determining the virtual fault location equation according to the fault type, the current fed into the AC system from the DC system and the AC parameters, comprises:
when the fault type is single-phase to ground fault, the virtual fault location equation is determined by equation 6:

$$p_1+p_2 R_g+p_3 x+p_4 x^2=0 \quad 6$$

where $R_g$ is the virtual transition resistance, x is the virtual fault location, $p_1$, $p_2$, $p_3$, $p_4$ are respectively:

$$\begin{cases} p_1 = dL_0 \frac{du_{ma}}{dt} + L_{W0}\frac{du_{ma}}{dt} + dR_0 u_{ma} + R_{W0} u_{ma} \\ p_2 = 3\left(-dL_0 \frac{di_{m0}}{dt} - L_{W0}\frac{di_{m0}}{dt} - dR_0 i_{m0} - R_{W0} i_m + u_{m0}\right) \\ p_3 = -L_0 \frac{du_{ma}}{dt} - dL_0 L_l \frac{d^2 i_{ma}}{dt^2} - 3dk_L L_0 L_l \frac{d^2 i_{m0}}{dt^2} - \\ \quad L_{W0} L_l \frac{d^2 i_{m0}}{dt^2} - 3k_L L_{W0} L_l \frac{d^2 i_{m0}}{dt^2} - dL_l R_0 \frac{di_{ma}}{dt} - \\ \quad 3dk_L L_l R_0 \frac{di_{m0}}{dt} - dL_0 R_l \frac{di_{ma}}{dt} - 3dk_R L_0 R_l \frac{di_{m0}}{dt} - \\ \quad L_{W0} R_l \frac{di_{ma}}{dt} - 3k_R L_{W0} R_l \frac{di_{m0}}{dt} - dR_0 R_l i_{ma} - \\ \quad 3k_R dR_0 R_l i_{m0} - L_l R_{W0} \frac{di_{ma}}{dt} - 3k_L L_l R_{W0} \frac{di_{m0}}{dt} - \\ \quad R_l R_{W0} i_{ma} - 3k_R R_l R_{W0} i_{m0} - R_0 u_{ma} \\ p_4 = L_0 L_l \frac{d^2 i_{ma}}{dt^2} + 3k_L L_0 L_l \frac{d^2 i_{m0}}{dt^2} + L_l R_0 \frac{di_{ma}}{dt} + \\ \quad 3k_L L_l R_0 \frac{di_{m0}}{dt} + L_0 L_l \frac{di_{ma}}{dt} + 3k_R L_0 R_l \frac{di_{m0}}{dt} + \\ \quad R_0 R_l i_{ma} + 3k_R R_0 R_l i_{m0} \end{cases}$$

where, d=1; $R_0$ and $L_0$ are respectively zero-sequence resistance and zero-sequence inductance of AC line; $R_{W0}$, $L_{W0}$ are respectively zero-sequence resistance and zero-sequence inductance of AC system at receiving end; $U_{m0}$ is zero-sequence voltage of AC line close to DC system side; $i_{m0}$ is zero-sequence current of AC line close to the DC system side; $R_l$, $L_l$ are positive-sequence resistance and positive-sequence inductance of AC line respectively, $k_R=(R_0-R_l)/(3R_l)$, $k_L=(L_0-L_l)/(3L_l)$, the AC parameters comprise: $R_0$, $L_0$, $R_{W0}$, $L_{W0}$, $u_{m0}$, $i_{m0}$, $R_l$ and $L_l$; $u_{ma}$ is the voltage component of the corresponding converter bus in the case of the fault; $i_{ma}$ is the current component fed into the AC system by the corresponding DC system in the case of the fault.

6. The method according to claim 4,
wherein determining the virtual fault location equation according to the fault type, the current fed into the AC system from the DC system and the AC parameters comprises:
when the fault type is phase-to-phase fault, the virtual fault location equation is expressed by equation 7:

$$p_5+p_6R_g+p_7x+p_8x^2=0 \qquad 7$$

where $R_g$ is the virtual transition resistance, x is the virtual fault location, $p_5$, $p_6$, $p_7$, $p_8$ are respectively:

$$\begin{cases} p_5 = 2dL_1\frac{du_{mab}}{dt} + 2L_W\frac{du_{mab}}{dt} + 2dR_lu_{mab}\,2R_Wu_{mab} \\ p_6 = \Delta u_{mab} - dL_l\Delta\frac{di_{mab}}{dt} - L_W\Delta\frac{di_{mab}}{dt} - \\ \qquad -d\Delta i_{mab}R_l - \Delta i_{mab}R_W \\ p_7 = -2L_l\frac{du_{mab}}{dt} - 2dL_l^2\frac{d^2i_{mab}}{dt^2} - 2L_WL_l\frac{d^2i_{mab}}{dt^2} - 4dL_lR_l\frac{di_{mab}}{dt} - \\ \quad 2L_WR_l\frac{di_{mab}}{dt} - 2dR_l^2i_{mab} - 2L_lR_w\frac{di_{mab}}{dt} - 2R_lR_Wi_{mab} - 2R_lu_{mab} \\ p_8 = 2L_l^2\frac{d^2i_{mab}}{dt^2} + 4L_lR_l\frac{di_{mab}}{dt} + 2R_l^2i_{mab} \end{cases}$$

where $u_{mab}$, $i_{mab}$ are the two-phase voltage difference value and current difference value of the AC line close to the DC system side respectively; $\Delta u_{mab}$, $\Delta i_{mab}$ are respectively the fault component of the two-phase voltage difference value and the fault component of the current difference value of the AC line near to the DC system side; $R_w$, $L_w$ are respectively the equivalent resistance and the equivalent inductance of the AC system at the receiving end, and the AC parameters comprise: $u_{mab}$, $i_{mab}$, $\Delta u_{mab}$, $R_w$, $L_w$ and $\Delta i_{mab}$; the $i_{mab}$ is calculated with the component of the current fed into the AC system from the DC system.

7. The method according to claim 6,
wherein determining the virtual fault location equation according to the fault type, the current fed into the AC system from the DC system and the AC parameters, comprises:
when the fault type is two-phase grounding fault or three-phase short circuit fault, the virtual fault location equation is expressed by equation 8:

$$p_5+2p_6R_g+p_7x+p_8x^2=0 \qquad 8.$$

8. The method according to claim 4,
wherein controlling the corresponding protection device to perform protection action according to the current at distance protection installation, the virtual fault location and the virtual transition resistance comprises:
determining the fault likeness factor according to the virtual fault location, the virtual transition resistance, the fault location equation and the current at the distance protection installation position;
determining the fault in the AC line zone when the fault likeness factor is not less than the preset threshold value of action, and controlling the corresponding protection device to perform the corresponding protection action in the AC line zone;
determining the fault out of the AC line zone when the fault likeness factor is less than the threshold value, and controlling the corresponding protection device to perform the corresponding protection action outside the AC line zone.

9. The method according to claim 8,
wherein determining the fault likeness factor according to the fault location equation and the current of each sampling point comprises specifically as follows:
the fault likeness factor is expressed by equation 9:

$$S_{hvdc} = \sum_{i=1}^{n}\frac{1}{|p_c(i) + p_{rg}(i)R_g + p_x(i)x + p_{x2}(i)x^2|} \qquad 9$$

where $S_{hvdc}$ is the fault likeness factor; n is the number of sampling points in 10 ms; $p_c(i)$, $p_{rg}(i)$, $p_x(i)$ and $p_{x2}(i)$ are respectively the constant term, the coefficient before transition resistance term, the coefficient before the virtual fault location term and the coefficient before the square term of the virtual fault location in the virtual fault location equation calculated by using the actual fault data of the ith sampling point.

10. A system for AC line distance protection in AC/DC hybrid power grid, comprising: a data collection device, a first processor for current calculation, a second processor for virtual fault location calculation and a third processor for protection control,
the data collection device configured to collect operation parameters of inverter-side converter, AC parameters, converter bus voltage, current of a distance protection installation and operation parameters of smoothing reactor of inverter station;
the first processor for current calculation configured to determine a conduction state of the inverter-side converter, according to the operation parameters of the inverter-side converter; and configured to determine current fed into the AC system from the DC system corresponding to the conduction state, according to the operation parameters of the inverter-side converter, the operation parameters of the smoothing reactor of the inverter station and the converter bus voltage;
the second processor for virtual fault location calculation configured to determine a virtual fault location and a virtual transition resistance, according to a fault type, the current fed into the AC system from the DC system and the AC parameters;
the third processor for protection control configured to control a corresponding protection device to perform protection action, according to the current at distance protection installation the virtual fault location and the virtual transition resistance.

11. The system according to claim 10, wherein the inverter-side converter is a 12-pulse converter, and the operation parameters of the inverter-side converter comprise the conduction state parameters of each valve arm in the 12-pulse converter;
the first processor for current calculation configured to:
determine that the inverter-side converter is in the conduction states of four valve arms, five valve arms, six valve arms, seven valve arms or eight valve arms according to the conduction state parameters of each valve arm in the 12-pulse converter.

12. The system according to claim 10, wherein the first processor for current calculation is configured to perform the following:

equation 1 is used to determine the current fed into the AC system by the DC system corresponding to the conduction states of the four valve arms:

$$I=\int[(K_d A_{d4}+K_y A_{y4})U - K_d D_{d4} - K_y D_{y4}]dt + f_{icom}(U) \qquad 1$$

equation 2 is used to determine the current fed into the AC system by the DC system corresponding to the conduction states of the five valve arms:

$$I=\int[K_y A_{i5}^{-1}(A_{g5}+A_{d5})+K_d A_{d5}]Udt - \int(K_y A_{i5}^{-1}+K_5)D_{d5}dt + f_{icom}(U) \qquad 2$$

equation 3 is used to determine the current fed into the AC system by the DC system corresponding to the conduction states of the six valve arms:

$$I=\int[-(K_d A_{d6}+K_y A_{y6})U]dt + f_{icom}(U) \qquad 3$$

equation 4 is used to determine the current fed into the AC system by the DC system corresponding to the conduction states of the seven valve arms:

$$I=\int[-(K_d A_{d7}+K_y A_{y7})U]dt + f_{icom}(U) \qquad 4$$

equation 5 is used to determine the current fed into the AC system by the DC system corresponding to the conduction states of the eight valve arms:

$$I=\int[-(K_d A_{d8}+K_y A_{y8})U]dt + f_{icom}(U) \qquad 5$$

where, $D_{d4}$, $D_{y4}$, $A_{d4}$, $A_{y4}$ are respectively the parameter matrixes under the conduction states of the four valve arms; $D_{d5}$, $A_{d5}$, $A_{g5}$, $A_{i5}$ are respectively the parameter matrixes under the conduction states of the five valve arms; $A_{d6}$, $A_{y6}$ are respectively the parameter matrixes under the conduction states of the six valve arms; $A_{d7}$, $A_{y7}$ are respectively the parameter matrixes under the conduction states of the seven valve arms; $A_{d8}$, $A_{y8}$ are respectively the parameter matrixes under the conduction states of the eight valve arms; $f_{icom}(U)$, which is the current that flows through AC filter and reactive power compensation device, is the function of converter bus voltage when the parameters of AC filter and reactive power compensation device are fixed; U is the voltage matrix of the converter bus; I is the current matrix fed into the AC system from the DC system; $K_y$ is the transformation matrix of the Y-bridge converter and $K_d$ is the transformation matrix of the D-bridge converter; wherein the 12-pulse converter comprises: the Y-bridge converter and the D-bridge converter.

13. The system according to claim 10, wherein the second processor for virtual fault location calculation configured to:
determine the virtual fault position equation according to the fault type, the current fed into the AC system from the DC system and the AC parameters;
determine the virtual fault position and the virtual transition resistance according to the virtual fault position equation.

14. The system according to claim 13, wherein the second processor for virtual fault location calculation configured that:
when the fault type is single-phase to ground fault, the virtual fault location equation is determined by equation 6:

$$p_1 + p_2 R_g + p_3 x + p_4 x^2 = 0 \qquad 6$$

where $R_g$ is the virtual transition resistance, x is the virtual fault location, $p_1$, $p_2$, $p_3$, $p_4$ are respectively:

$$\begin{cases} p_1 = dL_0 \dfrac{du_{ma}}{dt} + L_{W0} \dfrac{du_{ma}}{dt} + dR_0 u_{ma} + R_{W0} u_{ma} \\ p_2 = 3\left(-dL_0 \dfrac{di_{m0}}{dt} - L_{W0} \dfrac{di_{m0}}{dt} - dR_0 i_{m0} - R_{W0} i_m + u_{m0}\right) \\ p_3 = -L_0 \dfrac{du_{ma}}{dt} - dL_0 L_l \dfrac{d^2 i_{ma}}{dt^2} - 3dk_L L_0 L_l \dfrac{d^2 i_{m0}}{dt^2} - \\ \qquad L_{W0} L_l \dfrac{d^2 i_{ma}}{dt^2} - 3k_L L_{W0} L_l \dfrac{d^2 i_{m0}}{dt^2} - dL_l R_0 \dfrac{di_{ma}}{dt} - \\ \qquad 3dk_L L_l R_0 \dfrac{di_{m0}}{dt} - dL_0 R_l \dfrac{di_{ma}}{dt} - 3dk_R L_0 R_l \dfrac{di_{m0}}{dt} - \\ \qquad L_{W0} R_l \dfrac{di_{ma}}{dt} - 3k_R L_{W0} R_l \dfrac{di_{m0}}{dt} - dR_0 R_l i_{ma} - \\ \qquad 3k_R dR_0 R_l i_{m0} - L_l R_{W0} \dfrac{di_{ma}}{dt} - 3k_L L_l R_{W0} \dfrac{di_{m0}}{dt} - \\ \qquad R_l R_{W0} i_{ma} - 3k_R R_l R_{W0} i_{m0} - R_0 u_{ma} \\ p_4 = L_0 L_l \dfrac{d^2 i_{ma}}{dt^2} + 3k_L L_0 L_l \dfrac{d^2 i_{m0}}{dt^2} + L_l R_0 \dfrac{di_{ma}}{dt} + \\ \qquad 3k_L L_l R_0 \dfrac{di_{m0}}{dt} + L_0 L_l \dfrac{di_{ma}}{dt} + 3k_R L_0 R_l \dfrac{di_{m0}}{dt} + \\ \qquad R_0 R_l i_{ma} + 3k_R R_0 R_l i_{m0} \end{cases}$$

where, d=1; $R_0$ and $L_0$ are respectively zero-sequence resistance and zero-sequence inductance of AC line; $R_{W0}$, $L_{W0}$ are respectively zero-sequence resistance and zero-sequence inductance of AC system at receiving end; $u_{m0}$ is zero-sequence voltage of AC line close to DC system side; $i_{m0}$ is zero-sequence current of AC line close to the DC system side; $R_l$, $L_l$ are positive-sequence resistance and positive-sequence inductance of AC line respectively, $k_R = (R_0 - R_l)/(3R_l)$, $k_L = (L_0 - L_l)/(3L_l)$, the AC parameters comprise: $R_0$, $L_0$, $R_{W0}$, $L_{W0}$, $u_{m0}$, $i_{m0}$, $R_l$ and $L_l$; $u_{ma}$ is the voltage component of the corresponding converter bus in the case of the fault; $i_{ma}$ is the current component fed into the AC system by the corresponding DC system in the case of the fault.

15. The system according to claim 13, the second processor for virtual fault location calculation configured that:
when the fault type is phase-to-phase fault, the virtual fault location equation is expressed by equation 7:

$$p_5 + p_6 R_g + p_7 x + p_8 x^2 = 0 \qquad 7$$

where $R_g$ is the virtual transition resistance, x is the virtual fault location, $p_5$, $p_6$, $P_7$, $p_8$ are respectively:

$$\begin{cases} p_5 = 2dL_1 \dfrac{du_{mab}}{dt} + 2L_W \dfrac{du_{mab}}{dt} + 2dR_l u_{mab} + 2R_W u_{mab} \\ p_6 = \Delta u_{mab} - dL_l \Delta \dfrac{di_{mab}}{dt} - L_W \Delta \dfrac{di_{mab}}{dt} - \\ \qquad d\Delta i_{mab} R_l - \Delta i_{mab} R_W \\ p_7 = -2L_l \dfrac{di_{mab}}{dt} - 2dL_l^2 \dfrac{d^2 i_{mab}}{dt^2} - 2L_W L_l \dfrac{d^2 i_{mab}}{dt^2} - 4dL_l R_l \dfrac{di_{mab}}{dt} - \\ \qquad 2L_W R_l \dfrac{di_{mab}}{dt} - 2dR_l^2 i_{mab} - 2L_l R_W \dfrac{di_{mab}}{dt} - 2R_l R_W i_{mab} - 2R_l u_{mab} \\ p_8 = 2L_l^2 \dfrac{d^2 i_{mab}}{dt^2} + 4L_l R_l \dfrac{di_{mab}}{dt} + 2R_l^2 i_{mab} \end{cases}$$

where $u_{mab}$, $i_{mab}$ are the two-phase voltage difference value and current difference value of the AC line close to the DC system side respectively; $\Delta u_{mab}$, $\Delta i_{mab}$ are respectively the fault component of the two-phase voltage difference value and the fault component of the current difference value of the AC line near to the DC system side; $R_w$, $L_w$ are respectively the equivalent resistance and the equivalent inductance of the AC system at the receiving end, and the AC parameters comprise: $u_{mab}$, $i_{mab}$, $\Delta u_{mab}$, $R_w$, $L_w$ and $\Delta i_{mab}$; the $i_{mab}$ is calculated with the component of the current fed into the AC system from the DC system.

16. The system according to claim 15, wherein the second processor for virtual fault location calculation configured that:

when the fault type is two-phase grounding fault or three-phase short circuit fault, the virtual fault location equation is expressed by equation 8:

$$p_5 + 2p_6 R_g + p_7 x + p_8 x^2 = 0 \qquad 8.$$

17. The system according to claim 13, wherein the third processor for protection control configured to:
  determine the fault likeness factor according to the virtual fault location, the virtual transition resistance, the fault location equation and the current at the distance protection installation position;
  determine the fault in the AC line zone when the fault likeness factor is not less than the preset threshold value of action, and controlling the corresponding protection device to perform the corresponding protection action in the AC line zone;
  determine the fault out of the AC line zone when the fault likeness factor is less than the threshold value, and controlling the corresponding protection device to perform the corresponding protection action outside the AC line zone.

18. The system according to claim 17, wherein the third processor for protection control configured that:
  the fault likeness factor is expressed by equation 9:

$$S_{hvdc} = \sum_{i=1}^{n} \frac{1}{\left| p_c(i) + p_{rg}(i) R_g + p_x(i) x + p_{x2}(i) x^2 \right|} \qquad 9$$

where $S_{hvdc}$ is the fault likeness factor; n is the number of sampling points in 10 ms; $p_c(i)$, $p_{rg}(i)$, $p_x(i)$ and $p_{x2}(i)$ are respectively the constant term, the coefficient before transition resistance term, the coefficient before the virtual fault location term and the coefficient before the square term of the virtual fault location in the virtual fault location equation calculated by using the actual fault data of the ith sampling point.

19. A non-transitory machine-readable storage medium comprising instructions that when executed cause a processor of a computing device to:
  collecting operation parameters of inverter-side converter, AC parameters, converter bus voltage, current of distance protection installation and operation parameters of smoothing reactor of inverter station;
  determining conduction state of the inverter-side converter according to the operation parameters of the inverter-side converter;
  determining current fed into the AC system from the DC system corresponding to the conduction state according to the operation parameters of the inverter-side converter, the operation parameters of the smoothing reactor of the inverter station and the converter bus voltage;
  determining a virtual fault location and a virtual transition resistance according to a fault type, the current fed into the AC system from the DC system and the AC parameters;
  controlling a corresponding protection device to perform protection action according to the current at the distance protection installation, the virtual fault location and the virtual transition resistance.

* * * * *